United States Patent
Hibbard

(10) Patent No.: US 11,008,471 B2
(45) Date of Patent: May 18, 2021

(54) WATERBORNE LIGHT RADIATION ABSORBING POLYURETHANE MIXED POLYESTER POLYMER COATING SYSTEM

(71) Applicant: CLEAR TECHNOLOGY HOLDINGS, LLC, Birmingham, MI (US)

(72) Inventor: Jonathan Hibbard, Bramcote (GB)

(73) Assignee: Solaris Technology Ltd, Manchester (GB)

( * ) Notice: Subject to any disclaimer, the term of this patent is extended or adjusted under 35 U.S.C. 154(b) by 75 days.

(21) Appl. No.: 15/060,463

(22) Filed: Mar. 3, 2016

(65) Prior Publication Data

US 2016/0257824 A1    Sep. 8, 2016

Related U.S. Application Data

(60) Provisional application No. 62/127,645, filed on Mar. 3, 2015.

(51) Int. Cl.

| | | |
|---|---|---|
| *C09D 5/32* | (2006.01) | |
| *C09D 7/45* | (2018.01) | |
| *C09D 7/47* | (2018.01) | |
| *C09D 7/48* | (2018.01) | |
| *C09D 167/02* | (2006.01) | |
| *C08K 3/22* | (2006.01) | |
| *C08K 5/00* | (2006.01) | |

(52) U.S. Cl.
CPC ............... *C09D 5/32* (2013.01); *C09D 7/45* (2018.01); *C09D 7/47* (2018.01); *C09D 7/48* (2018.01); *C09D 167/02* (2013.01); *C08K 3/22* (2013.01); *C08K 5/005* (2013.01)

(58) Field of Classification Search
CPC .......................................................... C09D 5/32
USPC .................................... 252/500–518; 438/496
See application file for complete search history.

(56) References Cited

U.S. PATENT DOCUMENTS

| | | | |
|---|---|---|---|
| 2,472,831 A | 6/1949 | Hunter et al. | |
| 3,244,642 A | 4/1966 | Gasson et al. | |
| 4,230,763 A | 10/1980 | Skolnick | |
| 4,981,730 A * | 1/1991 | Zaleski | B05D 7/02 |
| | | | 252/502 |
| 5,998,543 A | 12/1999 | Collins et al. | |
| 2005/0277274 A1* | 12/2005 | Karkkainen | C01G 23/053 |
| | | | 438/496 |
| 2006/0106189 A1 | 5/2006 | Hesselmans et al. | |
| 2008/0264300 A1 | 10/2008 | Sato et al. | |
| 2014/0212675 A1 | 7/2014 | Wang et al. | |

FOREIGN PATENT DOCUMENTS

| | | |
|---|---|---|
| GB | 933070 | 7/1963 |
| JP | 2007-106826 | 4/2007 |

* cited by examiner

*Primary Examiner* — Monique R Peets
(74) *Attorney, Agent, or Firm* — BakerHostetler

(57) ABSTRACT

The disclosure is directed to an aqueous composition comprising a waterborne polymer, a non-ionic surfactant, a levelling component, an IR absorber, and at least one UV absorber.

9 Claims, 3 Drawing Sheets

WATERBORNE LIGHT RADIATION ABSORBING POLYURETHANE MIXED POLYESTER POLYMER COATING SYSTEM

CROSS-REFERENCES TO RELATED PATENT APPLICATIONS

This patent application claims priority to U.S. Patent Application No. 62/127,645, entitled "WATER-BASED LIGHT RADIATION ABSORBING POLYURETHANE MIXED POLYESTER POLYMER COATING SYSTEM," filed on Mar. 3, 2015, which is incorporated herein by reference in its entirety.

FIELD

The present disclosure is directed to a light dissipating waterborne polymer, which cures to form a clear or tinted flexible coating on glasses, plastics, or hard surfaces, and the coating is capable of absorbing ultra violet and infrared energy.

BACKGROUND

Window coatings that absorb light radiation have been developed. Conventional coatings are impractical in that they are typically cut to fit the size of an existing window, and require additional steps to apply. Chemicals that can be developed to make window treatments contain toxic chemicals that make their use impractical. Additionally, current coatings have limitations in achieving optical clarity, consistency, and practicality of application.

There remains a need to develop a coating system that can be used on a hard surface and provide an even and thin coating while still evenly and consistently absorbing infrared and ultraviolet light radiation. The disclosure addresses these and other needs.

BRIEF SUMMARY

In one aspect, the disclosure is directed to an aqueous composition comprising a water-borne polymer, a non-ionic surfactant, a levelling component, an IR absorber, and at least one UV absorber.

In some variations, the polymer can be selected from polyurethane, polyester, acrylic, polyurethane-polyester, and a combination thereof. In some variations, the IR absorber is a co-doped metal oxide. In some variations, polymer is less than 36 w/w %.

In some variations, the co-doped metal oxide can be selected from gadolinium oxide, tin oxide, iron oxide, manganese oxide, copper oxide, cobalt oxide, nickel oxide, antimony trioxide ($Sb_2O_3$), tin oxide ($SnO_2$), silver ($Ag_4O_4$) and chromium oxide ($Cr_2O_3$).

In some variations, the UV absorber is selected from tinuvin, 0.2% to 5 w/w % 2-Hydroxy-2-methyl-phenyl-propane-1, alpha-[3-[3-(2H-Benzotriazol-2-yl)-5-(1,1-dimethylethyl)-4-hydroxyphenyl]-1-oxopropyl]- and including omega-hydroxypoly(oxo-1,2-ethanediyl) and omega-[3-[3-(2Hbenzotriazol-2-yl)-5-(1,1-dimethylethyl)-4-hydroxyphenyl]-1-oxopropoxy]poly(oxy-1,2-ethanediyl), and polyethylene glycol 300.

In some variations, the surfactant is selected from polydimethylsiloxane-alcohol ethoxylate, polyethylene glycol, mono propylene glycol, a combination of PEG and AEOs in Surfynol 104E, cocoamidopropyl Betaine, cocoamide DEA 4000E, disodium Deterate, and propylene oxide block copolymers.

In some variations, the levelling component is selected from mono propylene glycol and cationic polysiloxane.

In some aspects, the composition can include at least one pigment. In some variations, the pigment can be selected from chromium oxide, aluminum pigments, copper pigments, cobalt pigments, manganese pigments, cobalt pigments, iron pigments, cadmium pigments, chromium pigments, lead pigments, titanium pigments, tin pigments, green pigment, yellow pigment, orange pigments, red pigments, brown pigments, black pigments, and carbon pigments. In certain variations, the pigment is shaped to be flattened disks and the pigment is in an amount of up to 5 percent by weight of the total composition.

In some aspects, the composition can comprise a dispersant.

In another aspect, the disclosure is directed to a kit comprising the aqueous composition and a second composition comprising a crosslinker. In some variations, the cross-linker is dicyclohexylmethane 4,4'-diisocyanate.

In another aspect, the disclosure is directed to a resin coated surface. The resin coated surface comprises a surface and a resin adhered to the surface. The resin comprising a crosslinked polymer, such as a polymer selected from a polyurethane, polyester, acrylic, polyurethane-polyester, and a combination thereof. The resin also includes an IR absorber and a UV absorber embedded within the cross-linked polymer.

In some variations, the IR absorber comprises a co-doped metal oxide. In some variations, the coating is flexible to bend at least 180° under 30 newtons. In some variations, the coating has a hardness of at least 4H. In some variations, the coating has an optical clarity of at least VLT of 30%. In some variations, the coating has a VOC less than 250 g/L. In some variations, the coating has a thickness ranging from 1 µm to 50 µm.

In another aspect, the disclosure is directed to a method for preparing a co-doped metal oxide composition. A mixture of tin and antimony powders is oxidized with nitric acid. The powers have a particle size equal to or less than 0.5 mm. The mixture has a ratio of tin to antimony in the range greater than 6:4 and less than 10:1. The oxidized mixture is washed of the oxides to remove soluble metal salts by water. The washed oxides are dried to remove water. The dried oxides can be heated to a temperature between 100° C. to 160° C. to produce a synthesized structure. In one variation, excess nitrous compounds are removed, for example by subjecting the synthesized structure to an elevated temperature, such as greater than 700° C. or 800° C. (e.g., 900° C.). In another variation, nano particles are milled to produce oxides. In some variations, the nano particles are sized from 10 nm to 1 µm.

In another aspect, the disclosure is directed to a method of forming a polymer coating on a hard surface. A water-based polyurethane dispersion a polymer dispersion comprising 10% to 40 w/w % polymer selected from a group consisting of polyurethane, polyester, acrylic, and polyurethane-polyester and a cross-linking agent is applied to the surface. The dispersion is cured to form a coating on the hard surface.

In some variations, the surface is glass. In various aspects, the coating blocks light energy to provide a BTU reduction ranging from 20% to 60%. In some variations, the coating is flexible to bend at least 180° at 55 Newton's. In some variations, the coating has a pensile hardness of at least 2H.

In some variations, the coating has an un-tinted optical clarity of at least VLT of 80%.

In some variations, the coating has a VOC less than 50 g/Litre. In some variations, the cured coating has a thickness ranging from 1 µm to 50 µm.

Additional embodiments and features are set forth in part in the description that follows, and will become apparent to those skilled in the art upon examination of the specification or may be learned by the practice of the disclosed subject matter. A further understanding of the nature and advantages of the present disclosure may be realized by reference to the remaining portions of the specification and the drawings, which forms a part of this disclosure.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1:
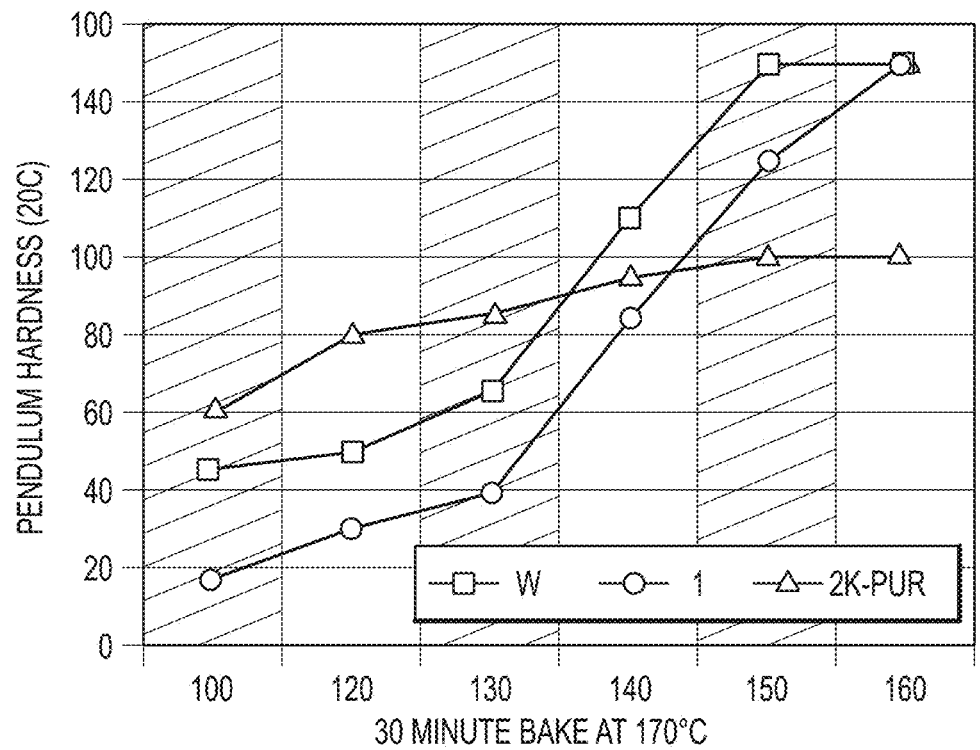
FIG. 1 shows Koenig Pendulum hardness vs. baking temperature in accordance with embodiments of the present disclosure.

The present disclosure may be understood by reference to the following detailed description, taken in conjunction with the drawings as described below. It is noted that, for purposes of illustrative clarity, certain elements in various drawings may not be drawn to scale.

The disclosure provides a coating (also referred to herein as a resin) adhered to a hard surface. The hard surface can absorb visible and non-visible light energy such as ultraviolet (UV) and infrared (IR). As such, in various embodiments the coating can dissipate heat. The coating may include IR absorbers or radiation dissipating nano structures or nanoparticles formed of co-doped metal oxides) and transparent cross-linked polymers that can include cross-linked polyurethane, polyester, and/or acrylic, among others. The UV absorbers may include organic compounds. The cross-linked polymers may include a mixture of polyurethane and polyester that can be combined or crosslinked by a curing agent (also referred to herein as a cross-linking agent).

The heat dissipating elements can be applied to the hard surface by incorporation into a water-based coating system. A liquid composition (also referred to as a dispersion) includes various components is applied to the surface, and then hardens to form the coating on the surface. The liquid dispersion can include first and second compositions. The first composition is a polymer dispersion that can include a polyurethane polyester, and/or acrylic thereof, a surfactant, a levelling component, an IR absorber, and/or a UV absorber. The liquid dispersion can also include a dispersant. The second composition includes a cross-linking compound.

When the two compositions are combined, the resulting liquid dispersion can be applied to a surface for form a coating. The coating can be very thin, for example, with a thickness ranging from 1 µm to 50 µm, as described herein.

The disclosure further provides a wet formulation that can be applied to windows to create an IR and UV absorbing surface. The wet formulation does not require any additional surfactant or other materials, as required by the conventional coatings. The compositions can be waterborne, and do not require an organic solvent. As such, the coating has improved clarity and heat dissipation properties as compared to conventional coatings.

It will be understood that in some aspects, the disclosure is directed to a composition including a water-borne polymer, a non-ionic surfactant, and a levelling component. The composition can include an IR absorber, a UV absorber, a pigment, or a combination of two or more thereof.

First Composition A

As noted above, first composition can include a water-borne polymer, such as polyurethane or polyurethane variations thereof, a surfactant, a levelling component, a pigment, an IR absorber, and/or a UV absorber. The first composition can include a dispersant. A water borne polymer is typically miscible in water Polymers The first composition can include water-borne polymer selected from polyurethane, polyester, acrylic, polyurethane-polyester, or a combination any thereof. Such polymers generally include any substitutions, such as isocyano substitutions or other substitutions, provided that the polymer remains miscible in water. When polyurethane is used, requires amine terminated to be miscible in water, while polyester or acrylic does not require amine terminated to be miscible in water.

Several variations of polyurethanes can be used, such as Hybridur Sovermol Bayhydrol A, Bayhydrol U-OH-Bayhydrol HD STEPANPOL Aliphatic Polyester Polyols polyurethane, among others. When combined with a second composition (e.g. cross-linker or curing agent) as described herein, the polyurethane chemically reacts with the second composition to crosslink and form a solid resin. In various aspects, the polymers are waterborne (or miscible). For example, polyurea based polyurethane (also referred to polyurethane-polyurea) can include an amine group, alternatively a terminal amine group, to be water miscible. In various embodiments, the polymers can include one or more polyisocyanate moieties. In some embodiments, when polyurethane is used, the polyurethane is Bayhydrol VP LS 2235/1 from Covestro. For example, the polyurethane or polyester can have a urea group covalently attached. A polyacrylate can have a hydroxyl bond covalently attached.

Without wishing to be held to a particular theory or mode of action, in some cases the polymers of the first composition can be made, for example, by combining a aqueous polyol phase that includes polyester and polycarbomate. The polyol phase can include an acid containing polyol or a blend of polyols containing an acid containing polyol, such that the average hydroxyl functionality of the polyol phase is at least 1.5. The polyol phase can have an acid number of between about 15 and 200. Polyols that form the basic back bone of the bayhydol polyurethane dispersion (PUD) are in the form of natural oil polyols derived from castor oil and other vegetable oils that are used to make elastomers.

The polymers of the first composition also can include a triethylamine amine phase $R_2NH+R'C(O)Cl+Et_3N \rightarrow R'C(O)NR_2+Et_3NH+Cl-$, which catalyzes the formation of urethane. The amine phase can include an amine or blend of amines containing active hydrogens reactive with NCO groups such that the average active hydrogen functionality is at least 1.5. The amine phase is present in a quantity sufficient to substantially neutralize the acid containing polyols.

The aqueous dispersion of chain-extended polyurethane-polyurea polymers can contain a high solid content, but possess a low viscosity so that the dispersions can be easily applied to a hard surface.

The aqueous dispersion may include polyurethane and polyester. The combination of the two components can improve flow. The dispersion may also incorporate a polycarbamate reaction as represented by RNCO+ R'OH→RNHCO$_2$R', which can improve the hardness of the coated hard surface. For example, the water-based polyurethane may be polymerized from polyurethane dispersion such as Bayhydrol VP LS 2235/1 to form a long chain polymer. The hardness increases with the length of the polymer or molecular weight of the polymer.

In various aspects, the combination of first and second compositions can be based on the reaction of an acidic polyol, with or without additional polyols present, and a triethanolamine amine which serves a dual purpose of neutralizing the acidic polyol and reactive hydrogen functionalities as chain extenders and/or cross linkers. The water-based polyurethane in chain extended phase is described in details later.

In some variations, the polymer can have an average molecular weight greater than or equal to 1000. In some variations, the polymer can have an average molecular weight greater than or equal to 2000. In some variations, the polymer can have an average molecular weight greater than or equal to 3000. In some variations, the polymer can have an average molecular weight greater than or equal to 4000. In some variations, the polymer can have an average molecular weight greater than or equal to 8000. In some variations, the polymer can have an average molecular weight less than or equal to 10,000. In some variations, the polymer can have an average molecular weight less than or equal to 8000. In some variations, the polymer can have an average molecular weight less than or equal to 4000. In some variations, the polymer can have an average molecular weight less than or equal to 3000. In some variations, the polymer can have an average molecular weight less than or equal to 2000. In some variations, the polymer may have an average molecular weight from 1500 to 2000.

In some variations, the polymer can be in an amount greater than or equal to 9 w/w %. In some variations, the polymer can be in an amount greater than or equal to 12 w/w %. In some variations, the polymer can be in an amount greater than or equal to 18 w/w %. In some variations, the polymer can be in an amount greater than or equal to 25 w/w %. In some variations, the polymer can be in an amount greater than or equal to 30 w/w %. In some variations, the polymer can be in an amount greater than or equal to 39 w/w %. In some variations, the polymer can be in an amount greater than or equal to 52 w/w %. In some variations, the polymer can be in an amount less than or equal to 52 w/w %. In some variations, the polymer can be in an amount less than or equal to 39 w/w %. In some variations, the polymer can be in an amount less than or equal to 18 w/w %. In some variations, the polymer can be in an amount less than or equal to 12 w/w %. In some variations, the polymer can be in an amount less than or equal to 10 w/w %. In some variations, the polymer is in an amount greater than 30 w/w % and less than 39 w/w %. It will be recognized that the upper and lower boundaries can be combined in any variation.

The first composition may be a two component system, e.g. a polyester and polyurethane combined system.

The performance characteristics of the cross-linked polymer coatings resulting can be better than organic solvent-based systems. These improvements can include hardness and resistance to solvents, weather, and abrasion, etc.

Water borne polymers can include those described by Schriven, et al., U.S. Pat. No. 4,066,591, Rosthauser et al., "Waterborne Polyurethanes", Journal Coated Fabrics; Vol. 16, July 1986, pp. 39-79, Hille et al., U.S. Pat. No. 4,945,128, each of which is incorporated by reference herein in its entirety.

Heating the dispersion may cause the polyols and NCO groups to react, forming a urethane. Other patents also relate to two component coating compositions comprising acidic polyester-polyols combinable with polyisocyanate components in an aqueous environment to form polyurethane coatings. Some are first combined with an isocyanate to form a polyurethane prepolymer. For example, Nachtkamp et al., U.S. Pat. No. 4,608,413, discloses aqueous storing lacquers containing pigments or fillers, which are included in combinations of polyurethane prepolymer containing partly or completely neutralized carboxyl groups and blocked isocyanate groups with polyurethane prepolymers containing free hydroxyl groups and partly or completely neutralized carboxyl groups, the disclosure of which is incorporated herein by reference in its entirety.

Kubitza et al., U.S. Pat. No. 5,075,370, discloses two-component aqueous coating compositions comprising an acidic polyol component containing at least one hydroxyl-containing polymer having an acid carboxylate or sulfonate group and a polyisocyanate, the disclosure of which is incorporated herein by reference in its entirety.

In various embodiments, the polymers disclosed herein include polymers described in Blum et al., U.S. Pat. No. 5,331,039, which is incorporated herein by reference in its entirety. Blum et al. relates to water-based binder compositions containing a mixture of at least two hydroxyl functional polyols with each of the polyol groups having an acidic function, the disclosure of which is incorporated herein by reference in its entirety. The organic polyisocyanate is emulsified in a mixture of acidic polyols such that the NCO:OH equivalent ratio is between 0.2:1 and 5:1. Polymers described by Blum et al. are incorportated herein by reference in their entirety.

In various embodiments, the polymers disclosed herein include polymers described in U.S. Pat. No. 5,352,733, filed Mar. 10, 1993, which is incorporated by reference in its entirety. U.S. Pat. No. 5,352,733 discloses a water based, solvent free, two component polyurethane-polyurea dispersion containing up to 65% solids. U.S. Pat. No. 5,352,733 is incorporated by reference in its entirety. The first component or composition is a polyester-polyol phase and an aqueous amine phase mixture. The polyester-polyol phase is a combination of modified polyester-polyols, low viscosity polyether or polyester-polyols, chain extending low molecular weight polyols, neutralizing amines and a detergent. The separate detergent component is required. The amine phase is a combination of neutralizing and chain extending amines having ratios pre-formulated to provide a balanced chain extending cross-linking reaction in aqueous phase with NCO reactive groups. The polyester-polyol and amines combined in water at room temperature to form an aqueous component having a solid content from 22 to 48%, which has an equivalent ratio between polyester-polyol and amine from 1.75:1 to 2.25:1. The second component or composition is a pure reactive aliphatic isocyanate having a viscosity of between 1000-3500 cps at 25° C., which provides an NCO to functional groups in the polyester-polyol/amine component ratio of between about 1:1.3 to 1:1.7. In various alternatives, the first composition may be a water-based two-component polyester and polyurethane-polyurea dispersion which, when combined with the second composition, can be fully cross-linked and/or are chain extended. For example, hydroxyl, ethanol, and/or ammonia functionalities can react with aliphatic and cycloaliphatic or aromatic isocyanates to cross-link and/or extend the two component system. The resulting coating can be stable over an extended period of time on a hard surface such as a window.

Surfactants

The compositions can include a non-ionic surfactant. The surfactants can take the form of polydimethylsiloxane-polyoxyalkylene block copolymers, silicone oils, nonylphenol ethoxylates, and other organic compounds. In foam applications, the surfactants are used to emulsify the liquid components, regulate cell size, and stabilize the cell structure to prevent collapse and sub-surface voids. In non-foam applications, the surfactants are used as air release and anti-foaming agents, as wetting agents, and are used to eliminate surface defects such as pin holes, orange peel, and sink marks. In various embodiments, the surfactant is used as a wetting agent.

In various embodiments, the first composition can include a non-ionic surfactant. The surfactant can act as a wetting agent. The surfactant wets the composition by reducing its surface tension. In various aspects, the surfactant is a non-ionic polymer, which can reduce or prevent cross-linking until a cross-linking compound is added. Without wishing to be limited to a particular mechanism or mode of operation, the presence of the surfactant keeps polymers in a mobile state. Without a surfactant, an increase in surface tension can result in uneven polymer distribution when the dispersion is applied to a surface, such as a window. Uneven polymer distribution results in an uneven coating when cured.

The surfactant may be included in the first composition. The surfactant can help reduce or prevent the first composition from foaming. In some aspects, the surfactant can de-foam the dispersion. Foams can be generated such that the coating may cause haziness from air pockets in the dispersion. Without using the surfactant, the coating applied on a vertical structure would have patchiness or haziness.

Any non-ionic surfactant known in the art can be used. The surfactant may also be low foaming. In some variations, the surfactant is an ethylene glycol type of surfactant, provided that it is non-ionic and does not include phosphates or sulphates. In various embodiments, a monopropylene glycol, (MPG) or polyethylene glycol (PEG) or a variation thereof can also be used, provided that it is non-ionic and does not include phosphates or sulphates. In some embodiments, the surfactant is Surfynol 104E by Air Product & Chemicals, Inc. Various additional surfactants can include polydimethylsiloxane-alcohol ethoxylate, polyethylene glycol, mono propylene glycol, a combination of PEG and AEOs in Surfynol 104E, cocoamidopropyl Betaine, cocoamide DEA 4000E, disodium Deterate, and propylene oxide block copolymers.

In some variations, the surfactant can be in an amount greater than or equal to 0.5 w/w %. In some variations, the surfactant can be in an amount greater than or equal to 1 w/w %. In some variations, the surfactant can be in an amount greater than or equal to 1.5 w/w %. In some variations, the surfactant can be in an amount greater than or equal to 2 w/w %. In some variations, the surfactant can be in an amount greater than or equal to 5 w/w %. In some variations, the surfactant can be in an amount less than or equal to 1 w/w %. In some variations, the surfactant can be in an amount less than or equal to 2 w/w %. In some variations, the surfactant can be in an amount less than or equal to 3 w/w %. In some variations, the surfactant can be in an amount less than or equal to 5 w/w %. In some variations, the surfactant can be in an amount less than or equal to 7 w/w %. In some variations, the surfactant can be in an amount less than or equal to 10 w/w %. In some variations, the polymer is in an amount greater than 1 w/w % and less than 7 w/w %. It will be recognized that the upper and lower boundaries can be combined in any variation.

Dispersant

In various embodiments, the first composition can also include a dispersant. The dispersant inhibits polymers from cross-linking to form long strings of polymers rather than an even coating. Without wishing to be limited to a particular mechanism or mode of operation, the dispersant can coat the polymers, and reduce or prevent or inhibit polymer molecules from agglomerating, thereby reducing clarity. In some cases, the dispersant is an optional component.

Any dispersant known in the art can be used. In some variations, the dispersant is polyacrylic acid or variation thereof. In some variations, the dispersant is Orotan 681 (Rohm and Haas Deutschland GmbH)]. In some variations, the dispersant is t-octylphenoxypolyethoxyethanol. In some variations, the dispersant is t-octylphenoxypolyethoxyethanol. In some variations, the dispersant is sodium polyacrylate or potassium polyacrylate.

In some variations, the dispersant can be in an amount greater than or equal to 0.2 w/w %. In some variations, the dispersant can be in an amount greater than or equal to 0.7 w/w %. In some variations, the dispersant can be in an amount greater than or equal to 1.5 w/w %. In some variations, the dispersant can be in an amount greater than or equal to 3 w/w %. In some variations, the dispersant can be in an amount greater than or equal to 5 w/w %. In some variations, the dispersant can be in an amount less than or equal to 1.0 w/w %. In some variations, the dispersant can be in an amount less than or equal to 1.5 w/w %. In some variations, the dispersant can be in an amount less than or equal to 3 w/w %. In some variations, the dispersant can be in an amount less than or equal to 5 w/w %. In some variations, the dispersant can be in an amount less than or equal to 10 w/w %.

Levelling Component

A levelling component may be added to the first composition to improve viscosity of the dispersion and to form an even fluid. The levelling component is miscible with water, but is not miscible with the polymer binder. Without levelling component, the viscosity of the dispersion may be lost and there would be uneven distribution when the dispersion is applied on a window or a hard surface. The levelling component may be a mono propylene glycol such as Bevaloid 770. The levelling component may also include cationic polysiloxane.

Without wishing to be limited to a particular mechanism or mode of operation, the levelling component helps the composition form an even fluid across a flat surface, such as a window surface. When the polyurethane crosslinks by using a crosslinker, water is squeezed out and evaporates from the window. The coating naturally becomes dried on the window.

In some variations, the levelling component can be in an amount less than or equal to 0.2 w/w %. In some variations, the levelling component can be in an amount less than or equal to 0.3 w/w %. In some variations, the levelling component can be in an amount less than or equal to 0.5 w/w %. In some variations, the levelling component can be in an amount less than or equal to 1 w/w %. In some variations, the levelling component can be in an amount less than or equal to 7 w/w %.

Pigments

In some variations, the resin or coating provides a sunlight shielding characteristic (i.e. a characteristic for shielding a light having a wavelength band of 300 to 2100 nm). In such instances, pigments may be added to the first composition to provide a reflective color or absorbent property.

In various aspects, different pigments can be added to the first composition. In various aspects, pigment(s) can be used instead of dyes, which readily oxidize. Following cross-linking and hardening, the resin is "breathable" and permeable to oxygen, allowing reaction with compounds therein. By using the pigment(s), the color remains in the coating.

One or more pigments can be used. In various embodiments, a green pigment is used. In various embodiments, an oxide black pigment can be used.

In some variations, the pigment includes one or more from the group consisting of chromium oxide, aluminum pigments, copper pigments, cobalt pigments, manganese pigments, cobalt pigments, iron pigments, cadmium pigments, chromium pigments, lead pigments, titanium pigments, tin pigments, green pigment, yellow pigment, orange pigments, red pigments, brown pigments, black pigments, and carbon pigments.

For example, the black pigments may include carbon pigments or carbon black, such as ivory black (PBk9), vine black (PBk8), and lamp black (Pbk6). The iron pigments may include iron black (PBk11) ($Fe_3O_4$).

The red pigments may include cadmium pigments, such as cadmium red (PR108) and cadmium selenide (CdSe), red lead pigments, such as lead tetroxide ($Pb_3O_4$), iron pigments, such as $Fe_2O_3$.

The orange pigments may include chromium pigments, such as chromium orange, chromate and lead (II) oxide ($PbCrO_4+PbO$), and cadmium pigments, such as cadmium orange.

The yellow pigments may include cadmium pigments, cadmium yellow, cadmium sulphide (CdS), chromium yellow, natural pigment of plumbous chromate ($PbCrO_4$), cobalt pigments, such as cobalt yellow (PY40), potassium cobaltinitrite ($Na_3Co(NO_2)_6$), iron pigments, such as Yellow Ochre (PY43): a naturally occurring clay of monohydrated ferric oxide ($Fe_2O_3.H_2O$), lead pigments, such as Naples Yellow (PY41), lead-tin-yellow, titanium pigments, Titanium Yellow (PY53), tin pigments, such as Mosaic gold, stannic sulfide ($SnS_2$). The green pigments may include synthetic chromium oxide ($CrO_3$), Cobolt Blue, Carbon Black, Iron 2 Oxide, Holtatint oxide black ($Fe_3O_4$), aluminum pigments, such as Ultramarine violet: (PV15), copper pigments, such as Han Purple: $BaCuSi_2O_6$, cobalt pigments (e.g. Cobalt Violet: (PV14) cobaltous orthophosphate), manganese pigments (e.g. Manganese violet: Manganic ammonium pyrophosphate), aluminum pigments (e.g. Ultramarine (PB29 ($Na_{8-10}Al_6Si_6O_{24}S_{2-4}$)), cobalt pigments (e.g. Cobalt Blue (PB28) and Cerulean Blue (P635), cobalt(II) stannate), copper pigments, such as calcium copper silicate ($CaCuSi_4O_{10}$) or Han Blue: $BaCuSi_4O_{10}$, iron pigments (e.g. Prussian Blue (PB27)), manganese pigments (e.g. Manganese Oxide Blue), cadmium pigments, such as Cadmium Green: Cadmium Yellow (CdS) and Viridian ($Cr_2O_3$), chromium pigments, Chrome green (PG17): chromic oxide ($Cr_2O_3$), Viridian (PG18), or hydrated chromic oxide ($Cr_2O_3$—$H_2O$), copper pigments, such as Azurite: cupric carbonate hydroxide ($Cu_3(CO_3)_2(OH)_2$), Malachite: cupric carbonate hydroxide ($Cu_2CO_3(OH)_2$), Paris Green: cupric acetoarsenite ($Cu(C_2H_3O_2)_2.3Cu(AsO_2)_2$), Scheele's Green (also called Schloss Green): cupric arsenite ($CuHAsO_3$), or Verdigris: various poorly soluble copper salts, notably cupric acetate ($Cu(CH3CO_2)_2$) and malachite ($Cu_2CO_3(OH)_2$).

Without wishing to be limited to a particular mechanism or mode of operation, pigments with small particle size can be used to reduce or prevent a prism effect. In some variations, the particle size is less than 50 nm. In some variations, the particle size is less than 40 nm. In some variations, the particle size is less than 30 nm. In some variations, the particle size is less than 20 nm. In some variations, the particle size is less than 10 nm. Any more than that, get a prism effect within the polymer structure.

In some variations, the pigment can be in an amount less than or equal to 5 w/w %. In some variations, the pigment can be in an amount less than or equal to 4 w/w %. In some variations, the pigment can be in an amount less than or equal to 3 w/w %. In some variations, the pigment can be in an amount less than or equal to 2 w/w %. In some variations, the pigment can be in an amount less than or equal to 1 w/w %.

The pigments can be flattened to be like disks and can be added to the first composition in the amount of 4 w/w %. The pigments may have a disk diameter of about 50 nm to 200 nm. Typically, a much smaller amount of pigments can be added to the first composition without being flattened, for example, only 0.5 w/w %.

IR Absorbers

The first composition may also include one or more IR absorbers. In some aspects, multiple IR absorbers are added to the composition. Because different IR absorbers absorb IR radiation at different wavelengths, one can identify which ones are receptive. As such, near-IR wavelengths for absorption are of particular interest. Table 1 shows the near-IR absorbers (e.g. co-doped oxides) and their respective wavelength ranges (in Wavenumber) for absorption.

IR absorbers can be IR radiation powders that are a mixture of co-doped gadolinium oxide, tin oxide, iron oxide, manganese oxide, copper oxide, cobalt oxide, nickel oxide, antimony trioxide ($Sb_2O_3$), tin oxide ($SnO_2$), silver ($Ag_4O_4$) and chromium oxide ($Cr_2O_3$). The oxides are then further synthesized to form an up-converting co-doped structure. The procedure for preparing the up-converting co-doped structure is described later.

TABLE 1

Absorption Wavelength Range of IR Absorbers-Co-doped Metal Oxides

| Oxide | 1400-700 $cm^{-1}$ | 699-600 $cm^{-1}$ | 599-500 $cm^{-1}$ | 499-400 $cm^{-1}$ | 399-300 $cm^{-1}$ | 299-200 $cm^{-1}$ | 200-60 $cm^{-1}$ |
|---|---|---|---|---|---|---|---|
| $WO_2$ | n/a | 690 | 585 | n/a | 390 | 215 | n/a |
| $CeO_2$ | 900-800 | 670 | 558 | n/a | 306 | n/a | 160 |
| $SiO_2$ | 1170-1083, 799-780 | 697 | 511 | 460 | n/a | n/a | n/a |
| $SbO_3$ | 1366-1267 | 640 | n/a | 435 | n/a | 220 | 90 |

TABLE 1-continued

Absorption Wavelength Range of IR Absorbers-Co-doped Metal Oxides

| Oxide | 1400-700 cm$^{-1}$ | 699-600 cm$^{-1}$ | 599-500 cm$^{-1}$ | 499-400 cm$^{-1}$ | 399-300 cm$^{-1}$ | 299-200 cm$^{-1}$ | 200-60 cm$^{-1}$ |
|---|---|---|---|---|---|---|---|
| Ag$_2$O | 1020-1022 | n/a | n/a | n/a | 311 | 240 | 90 |
| SnO$_2$ | 1385-1388 | n/a | n/a | 440 | 360 | n/a | n/a |
| TiO$_2$ | n/a | 650 | 580 | 460 | n/a | 276 | n/a |
| Y$_2$O$_3$ | n/a | n/a | 560 | 460 | n/a | 240 | 182-172 |
| ZrO$_2$ | 726-730 | n/a | 581-510 | 425 | n/a | 256-225 | n/a |

Any IR absorber or combination thereof can be used. In some variations, the IR absorbers include talc (silicon dioxide). In some variations, the IR absorbers include indium tin oxide, which can absorb in two different IR wavelength ranges in the near IR and far IR.

In various aspects, each of the IR absorbers absorb IR radiation at different wavelength ranges. In particular, the near IR absorbers are used because the near IR absorbers absorb more energy than the far-IR absorbers. Also, by adding combinations of the absorbers, the combinations can absorb more than each single absorber, for example, with a total absorption of 60%.

In various aspects, the combinations of IR absorbers absorb equal to or greater than 40% of IR radiation. Alternatively, the combinations of IR absorbers absorb equal to or greater than 50% IR radiation. Alternatively, the combinations of IR absorbers absorb equal to or greater than 60% IR radiation.

Table 2 shows the absorption of various oxides and various combinations of oxides and their absorption. For example, as shown in Table 2, when the absorbers include multiple oxides including WO$_2$, SiO$_2$, and SnO$_2$ that are co-doped, the absorption is 42%. When the absorbers include multiple oxides including WO$_2$, SiO$_2$, SbO$_3$, Ag$_2$O, and SnO$_2$ that are co-doped, the absorption of the multi-co-doped oxides is 32%. When the absorbers include two oxides SbO$_3$ and SnO$_2$ that are co-doped, the total absorption is 34%. Other combinations of absorbers may result in absorption of 32%, 25%, or 36%. In various aspects, when the combination of the IR absorbers has absorption exceeding 60%, the coating including the IR absorbers can reveal haziness even when the particles or crystals are sized to 4-5 nm. Without wishing to be held to any particular mechanism or mode of action, light distortions may cause the haziness.

embodiments, the IR absorbers may also include antimony tin oxide (ATO). In some embodiments, the IR absorbers may also include cerium oxide. The combination of the absorbers may vary according to a particular need.

In some embodiments, the IR absorbers may include a combination of 0.01 w/w % tungsten VI silicone oxide nano powder less than 20 nano meters, 0.2 w/w % to 1 w/w % plus tungsten VI tin oxide nano powder less than 40 nano meters, 0.1 w/w % to 0.4 w/w % plus indium tin oxide nano powders less than 30 nano meters, 0.01 w/w % to 1 w/w % plus cerium iv antimony tin oxide less than 20 nano meters 0.3 w/w % to 2 w/w %, and 0.3 to 1 w/w % gadolinium oxide co-doped with antimony tin oxide less than 30 nano meters.

In some variations, the IR absorber can be in an amount greater than or equal to 0.3 w/w %. In some variations, the IR absorber can be in an amount greater than or equal to 0.7 w/w %. In some variations, the IR absorber can be in an amount greater than or equal to 1.0 w/w %. In some variations, the IR absorber can be in an amount greater than or equal to 1.5 w/w %. In some variations, the IR absorber can be in an amount greater than or equal to 2 w/w %. In some variations, the IR absorber can be in an amount less than or equal to 0.7 w/w %. In some variations, the IR absorber can be in an amount less than or equal to 1 w/w %. In some variations, the IR absorber can be in an amount less than or equal to 1.5 w/w %. In some variations, the IR absorber can be in an amount less than or equal to 2 w/w %. In some variations, the IR absorber can be in an amount less than or equal to 5 w/w %.

UV Absorbers

In various embodiments, one or more ultraviolet (UV) absorbers are added to the first composition. Any UV absorber or combination thereof can be used. In some variations, the UV absorber is tinuvin.

TABLE 2

Absorption of IR Absorbers-Co-Doped Oxides

| Oxide | Single Metal Oxide Absorption | Co-doped Metal Oxide Absorption | Co-doped Metal Oxide Absorption 2 | Co-doped Metal Oxide Absorption 3 | Multi Co-doped Metal Oxide Absorption 4 | Multi-Co-doped Metal Oxide Absorption 5 | Multi-Co-doped Metal Oxide Absorption 6 |
|---|---|---|---|---|---|---|---|
| WO$_2$ | 22 | | 16 | | 14 | 9 | 8 |
| CeO$_2$ | 20 | | | 12.5 | | 9 | |
| SiO$_2$ | 19 | | 16 | 12.5 | 14 | | 8 |
| SbO$_3$ | 10 | 17 | | | | 9 | 8 |
| Ag$_2$O | 4 | | | | | | 8 |
| SnO$_2$ | 8 | 17 | | | 14 | 9 | 8 |
| Total | | 34 | 32 | 25 | 42 | 36 | 32 |

In some embodiments, the near IR absorbers may include silicon oxide (e.g. Micro-Talkum A.T.1), which allows formation of a large structure. In some embodiments, the IR absorbers may also include indium tin oxide, which absorbs at 2 different IR spectra, e.g. both near IR and far IR. In some In some variations, the UV absorbers can include titanium dioxide, zinc oxide, In some embodiments, the UV absorbers can include 2-Hydroxy-2-methyl-phenyl-propane-1, alpha-[3-[3-(2H-Benzotriazol-2-yl)-5-(1,1-dimethylethyl)-4-hydroxyphenyl]-1-oxopropyl], omega-hydroxypoly(oxo- 1,2-ethanediyl) (CAS NO. 104810-48-2), omega-[3-[3-(2Hbenzotriazol-2-yl)-5-(1,1-dimethylethyl)-4-hydroxyphenyl]-1-oxopropoxy]poly(oxy-1,2-ethanediyl) (CAS NO. 104810-47-1), polyethylene glycol 300 (CAS NO. 25322-68-3), or combinations thereof. The UV absorbers can include UV absorbent material containing 0.2 w/w % to 5 w/w % 2-Hydroxy-2-methyl-phenyl-propane-1, 0.2 w/w % to 1 w/w % alpha-[3-[3-(2H-Benzotriazol-2-yl)-5-(1,1-dimethylethyl)-4-hydroxyphenyl]-1-oxopropyl]- and including omega-hydroxypoly(oxo-1,2-ethanediyl) (CAS NO. 104810-48-2) and omega-[3-[3-(2Hbenzotriazol-2-yl)-5-(1,1-dimethylethyl)-4-hydroxyphenyl]-1-oxopropoxy] poly(oxy-1,2-ethanediyl) (CAS NO. 104810-47-1), and 0.2 w/w % to 3 w/w % polyethylene glycol 300 (CAS NO. 25322-68-3), or combinations thereof.

In some variations, the UV absorber can be in an amount less than or equal to 5 w/w %. In some variations, the UV absorber can be in an amount less than or equal to 4 w/w %. In some variations, the UV absorber can be in an amount less than or equal to 3 w/w %. In some variations, the UV absorber can be in an amount less than or equal to 2 w/w %. In some variations, the UV absorber can be in an amount less than or equal to 1 w/w %.

Second Composition—Crosslinkers

A second composition includes one or more cross-linkers that cross-link moieties on the polymer when the compositions are combined. The cross-linker results in conversion of a polymer solution to a hard resin. The waterborne polymer is no long water miscible once crosslinked.

Aliphatic and cycloaliphatic isocyanates can be used in smaller volumes, most often in coatings and other applications where color and transparency are important, since polyurethanes made with aromatic isocyanates tend to darken after exposure to light Aliphatic and cycloaliphatic isocyanates can include 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane, (H12MDI or hydrogenated MDI).

In various aspects, a polyisocyanate can be used as a crosslinker for hydroxy functional water-based resins. The polyisocyanate crosslinker can be modified with water soluble moieties by dispersing the crosslinker in a water-based resin formulation, while the amount of time for the crosslinker to be in direct contact with water is minimized. The side reaction of isocyanate with water is reduced because the side reaction of isocyanate with water generates carbon dioxide, and increases the generation of nitrogen.

In some embodiments, the crosslinker can be non-toxic, such as a poly-isocyanide. The cross-linker can be an EPA-approved curing agent. The second composition is a member selected from the group consisting of an aliphatic polyisocyanate, a cycloaliphatic polyisocyanate and an aromatic polyisocyanate and adducts and mixtures thereof. The crosslinker can also include, but not limited to Desmodur® aliphatic and cycloaliphatic isocyanates, 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane, (H12MDI or hydrogenated MDI). In some specific aspects, the cross-linker is Desmodur N 3600. When the second composition is combined with the first composition on the surface (such as a window surface), a resin is formed. The resin can include crosslinked polymer and the IR absorbers, UV absorbers, and optionally other compounds embedded with the crosslinked polymer. Water evaporates and naturally dries during crosslinking reaction of the combined first and second compositions. Other components such as surfactants and dispersants can also be removed during removal of water.

The ratio between the isocyanate equivalents and the sum of the active hydrogen equivalents of the polyols and amines is at least 0.5:1 and is preferably at least 1.1:1. The reaction of the isocyanate groups with the active hydrogen moieties from the polyols and amines can result in both linear and crosslinking polymerization. In theory, a maximum molecular weight can be reached when one equivalent of isocyanate reacts with one equivalent of hydroxyl, that is, when the ratio of NCO to OH is 1.0 to 1.0 (see Equation 1, Table 3 as disclosed later). In practice, a small excess of isocyanate, for example, about 5-10 w/w %, is often used to allow for the likely destruction of isocyanate by water contained in solvents and pigments, so that the NCO to OH ratio is maintained at a ratio of NCO to OH at 1.0 to 1.0. It is sometimes desirable to vary the NCO to OH ratio from about 0.9 to 1.0 about 1.2 to 1.0 in order to modify the properties of the coating. In any event, it is important that the NCO to OH ratio be controlled.

Isocyanate groups can include isocyanate variations, as described below. These can include 1,2,4-benzene triisocyanate and polyethylene polyphenyl isocyanate. Examples of suitable monisocyanates are cyclohexyl isocyanate, phenylisocyanate and toluene isocyanate. Examples of acceptable aromatic diisocyanates are 4,4'-diphenylmethane diisocyanate, 1,3-phenylene diisocyanate, 1,4-phenylene diisocyanate and tolylene diisosyanate. Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include 1,4-cyclohexyl diisocyanate, isophorone diisocyanate, alpha, alpha-xylylene diisocyanate and 4,4-methylene-bis(cyclohexyl isocyanate). Substituted organic polyisocyanate can also be used in which the substituents are nitro, chloro, alkoxy and other groups which are not reactive with hydroxyl groups or active hydrogens and provided the substituents are not positioned to render the isocyanate group unreactive.

Thioisocyanates corresponding to the above-described can be employed as well as mixed compounds containing both an isocyanate and a thioisocyanate group. The terms "polyisocyanate" and "diisocyanate", as used in the present specification and claims, are intended to cover compounds and adducts containing thioisocyanate groups or isocyanate groups and compounds and adducts containing both isocyanate and thioisocyanate groups. Among these adducts are biurets of isocyanurates, uretdiones, carbodiimides, and prepolymers formed by the reaction of excess multifunctional isocyanates with polyols. Particularly preferred isocyanate adducts are those based on hexamethylene diisocyanate (HDI).

This two-component system can then be activate by combining the first and second compositions. In various aspects, at least 0.5 isocyanate equivalents for each active hydrogen equivalent of the polymer are used. In some instances, there are between about 1.1 and 3 isocyanate equivalents for each active hydrogen equivalent of the polymer component. In some instances, there are 1.3 to 2.0 isocyanate equivalents per polymer active hydrogen equivalent. This amount of isocyanate used is sufficient to provide an over indexing of —NCO groups to functional groups in the polymer. This provides sufficient —NCO groups to increase chain extension and crosslinking within the polymer structure.

This blend results in an aqueous, organic low solvent polyurethane dispersion having a solids content of between about 45 to 75 w/w %. This provide an excellent low VOC protective coating blend for application to almost any substrate such as glass, Epoxy resin, plastic and metal. It is particularly suitable for application to substrates that are subject to sunlight, or to heavy traffic where abrasion resistance is required. It is also designed for use where a highly aesthetic, durable protective coating is required. It is an excellent coating for severe coastal, or offshore environments It may be applied to clean and dry substrates at temperatures above about 50° F. and cleans up completely and easily with soap and water.

This multi-component system cures through chemical reaction and is therefore not dependent on atmospheric conditions. Additionally, the blend is water reducible. When being applied in difficult conditions or conditions of high humidity additional heating may be required in the form of IR and UV heating lamps. In some variations, the solids content of the reduced blend is not less than about 27%.

Coating on a Substrate

Use of the liquid coating applied directly to a surface of a substrate, such as a window, provides substantial advantages over conventional window covering. The resin formed from the first composition and the second composition is flexible enough to be put on any surface, and in various cases can have a dynamic angle of application that can exceed 270 degrees. Window bubbles do not need to be removed.

The resin may be formed as a coating or a film over the surface of the substrate. The coating is flexible and less expensive than lamination or resin injection molding. The coating may become a permanent addition to the surface for a window, such as a single panel system or a multi-panel system. In some embodiments, the coating can be applied to vertical structures having a hard surface. In some embodiments, the coating can be applied to a display booth or portable showroom in an atrium. In some embodiments, the coating can be applied to external and internal surfaces of a boat, a car, or an aircraft, where unwanted heating requires additional expensive mechanical cooling. The coating can result in significant heat reduction from light radiation.

In some aspects, the coating may have sufficient hardness and transparency for a window to provide a coated surface with no visible distortion. The coating having co-doped metal oxides for light radiation dissipation on a surface is a passive heat exchanger or heat sink.

The combination of metal oxides co-doped in combination with UV absorbers can achieve a UV blocking mechanism that may achieve a transmission rate from 2% to 4%. For example, the IR absorption may vary from 10% to 60%. The coating relies on the interaction of photon energy within IR and UV light and the saturation of nano particles embedded within the coating in various wavelengths.

In some variations, the thickness of the resin or coating is 50 microns or less. In some variations, the thickness of the resin is 40 microns or less. In some variations, the thickness of the resin in 20 microns or less. In some variations, the thickness of the resin is 20 microns or less. In some variations, the thickness of the resin in 10 microns or less. In some variations, the thickness of the resin is 5 microns or less.

A series of water soluble polymer dispersions, such as polyurethane dispersions, can be prepared by a mixture isocyanate and non-isocyanate chemistry and isocyanate chemistry. A number of co-doped metal oxides and metal phosphors can be introduced into the water-based polymer dispersion. The metal oxides can form nano structures in the cured polymer coating.

The water-based polymer dispersion is pourable and can form a very thin transparent film that is also very flexible. The water-based polymer dispersion may be tinted to any color by adding pigments.

In some embodiments, polymer dispersions are organic solvent-free and are formulated into coatings which are low in VOC, meet the need for water-based resins, and are environmentally compliant, safe to install, and also compliant to health associated expectations and regulations.

Making Water-Based Polyurethane having Chain Extension Phase

Typical waterborne polyurethanes are polyurethane-polyurea polymers containing both urethane (—NH—CO—O—) and urea (—NH—CO—NH—) groups in a macromolecular chain. These groups are formed by poly-addition reactions. The addition reaction between polyisocyanate and polyols to form a urethane grouping may be depicted as:

OCN—NCO+HO—OH+OCN—NCO→OCN—NHCO—O—O—CONH—NCO

A similar poly addition reaction between polyisocyanate and amines to form a urea grouping may be represented as:

OCN—NCO+H2N—NH2+OCN—NCO→OCN—NHCONH—NHCONH—NCO

The structure relies on an addition of 12% fatty ester coconut oil and 25% unsaturated polyester represented as:

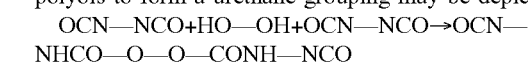

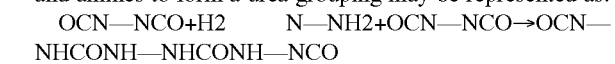

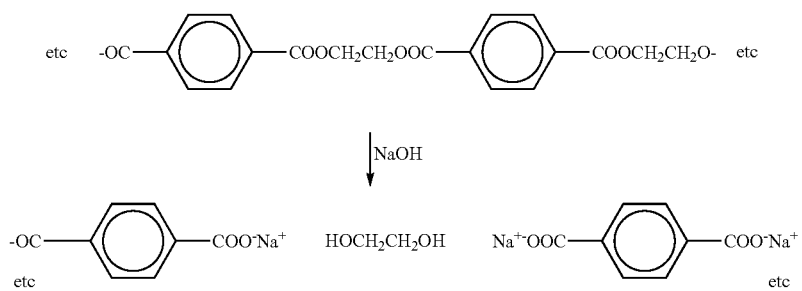

Many current waterborne (i.e. water miscible) polymers have one manufacturing process in common. In a first phase of production, a medium molecular weight "prepolymer" is synthesized in a reactor at an elevated temperature ranging from 60° to 100° C., which leaves approximately 3% to 7% free/terminal unreacted isocyanate (—NCO) groups. In order for the water-based polymer to have high-performance properties, e.g., flexibility, hardness, and resistance to acid, solvent, and abrasion, the polymer can be chain-extended in a water phase such that the polymer can have a high molecular weight.

The increase in molecular weight can be achieved by reacting the organic compounds that contain the functional group ~N=C=O, also referred to as isocyanates or NCO groups, of the pre-polymer with amines, making a weak acid alkaline.

In various embodiments, the pre-polymer (also referred to a monomer or system of monomers) with intermediate molecular weight can be reacted to form a stable polymer, which can be added with metallic oxides that form a nano structure embedded within the polymer. The fast urea formation reaction (—NCO+NH2-→-NHCONH—) may be controlled or stabilized and viscosity build up as a result of increasing of the molecular weight, which must be controlled.

The water-borne aliphatic polyurethane dispersions are generally limited to solid contents of 26 w/w % up to a maximum of 36 w/w %, and a polyester content of less than 15 w/w %.

U.S. Pat. No. 5,352,733, filed on Mar. 10, 1993, discloses water-based polyurethane, which is incorporated herein by reference. Water soluble polyurethane-polyurea polymers containing both urethane (—NH—CO—O—) and urea (—NH—CO—NH—) groups in a macromolecular chain. These groups are formed by addition reactions. The addition reactions between polyisocyanate and polyols for forming a urethane grouping may be depicted as the following:

OCN—NCO+HO—OH+OCN—NCO→OCN—NHCO—O—O—CONH—NCO

A similar addition reaction between polyisocyanate and amines for forming a urea grouping may be represented as the following:

OCN—NCO+H2 N—NH2+OCN—NCO→OCN—NHCONH—NHCONH—NCO

Waterborne polymers can have one common manufacturing process-chain extension. In the first phase of production, a medium molecular weight "prepolymer" is evaporated in a reactor at an elevated temperature (55°-86° C.) leaving approximately 2% to 8% free terminal unreacted isocyanate (—NCO) groups. In order for the polymers to have high-performance properties, e.g., flexibility, hardness, and resistance to acid, solvent and other chemicals and abrasion, the polymer must be chain-extended in the water phase. The chain-extension phase is a build-up of the prepolymer to form the polymer having a higher molecular weight than the prepolymer, which enhances the performance or properties of the polymer.

The build-up for high molecular weight is usually performed by reacting the NCO groups of the prepolymer with one of three polarized phases, i.e. anionic, cationic, or non-ionic, more specifically, reacting with amines. During the course of this reaction, the extremely fast urea formation reaction, (e.g. —NCO+NH2-→-NHCONH—), must be stabilized. Also, the viscosity increase resulting from increasing the molecular weight must be minimized.

One way to reduce the viscosity is to use low contents of solid dispersions of water-borne polymer in a solvent as an intermediate aid to control the viscosity build-up during the chain-extension phase. Typically, a solvent, such as methyl ethyl ketone or N-methyl pyrrolidone (NMP), may be used in the manufacturing stage of the coating, but may be removed before the finishing stage to allow the polymer solvent free. In this process, a polyol is reacted with a diisocyanate to form a prepolymer. Then, in the presence of the solvent, such as methyl ethyl ketone or NMP, the prepolymer is reacted with a chain extender, such as a polyamine, e.g. ethylenediamine or diethylenetriamine. The solvent based extended urethane polymer is then diluted with water to form an aqueous dispersion of the urethane prepolymer and the aliphatic amine chain extended urethane polymer. The solvent must then be removed by distillation or evaporation to yield an aqueous dispersion of urethane containing components ranging from the medium molecular weight urethane prepolymer to the high molecular weight aliphatic amine chain extended polymer.

The common process for manufacturing water-borne polymer is the so-called "prepolymer blending process." This process utilizes hydrophilically modified prepolymers having free terminal NCO-groups which are more compatible with aqueous systems. These prepolymers, possessing hydrophilicity, are therefore more susceptible to being chain extended with diamines in water, in contrast to a solvent phase. For the hydrophilic prepolymer blending/mixing process, the dispersion phase must be performed in a very short period of time at temperatures below the critical point where the NCO groups would rapidly start to react with water to form carbamic acid groups $NH_2COOH$ or $CH_3NO_2$ and release carbon dioxide. To improve this process, use a 3% to 7% w/w solvent can be used to adjust for the viscosity build-up during the chain-extension and/or cross-linking phases.

The process utilizes chain extension in the water-phase resulting in the prepolymers being either reacted with dysfunctional amines to yield linear, flexible polyurethane-urea, or cross-linked with polyfunctional amines to produce cross-linked systems. The water-based polymer contain a combination of amphoteric ionic and non-ionic internal emulsifiers.

The cured polymer films when cross-linked with polyfunctional amines exhibit improved solvent resistance compared to films made from the organic solvent based polymer.

In some aspects, the disclosure provides waterborne or water reducible blocked polyisocyanate and a hydroxyl-functional dispersion of polymer in order to achieve rapid drying and heat dissipation for a coating (e.g. a functional glass coating). The multi-component system can include a water-reducible blocked polyisocyanate and a hydroxy-functional polymer dispersion. The disclosure also provides methods for resin preparation and chemical reactions between the blocked polyisocyanate and the hydroxy-functional polymer dispersion.

Equation (1) shows a general reaction path for producing both components of a waterborne glass coating.

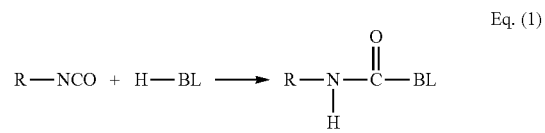

Eq. (1)

As shown in Equation (1), the hydroxy-functional polyurethane dispersion is prepared in a slightly different manner. First, reacting a diisocyanate monomer with an OH-functional compound (i.e., polyester, polyether, and polycarbonate) forms the polyurethane prepolymer. The prepolymer is then hydrophilically modified, followed by chain extension, introduction of the OH groups, and dispersion in water.

The following Equation (2) shows formation of a blocked polyisocyanate.

(IV)

Eq. (2)

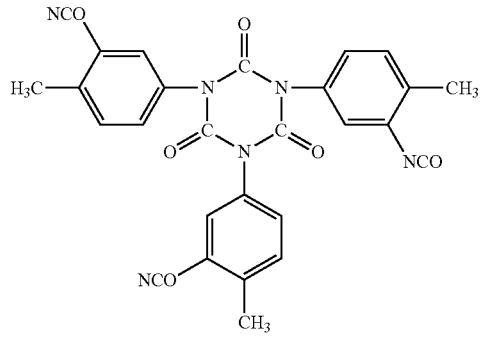

The first step in the synthesis of the blocked polyisocyanate is the formation of an NCO-terminated polyisocyanate adduct (i.e., an isocyanurate or a biuret). This adduct is then modified with hydrophilic groups and blocked with a suitable blocking agent (H-BL) according to the reaction mechanism shown in Equation (2). The water-reducible blocked polyisocyanate is subsequently dispersed in water.

Equation (3) shows formation of a polyurethane linkage.

Eq. (3)

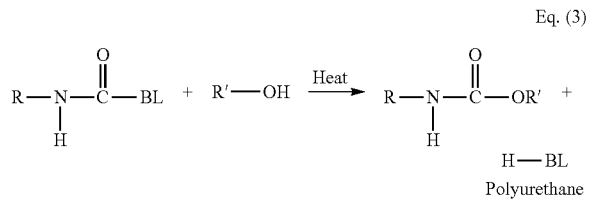

The reaction between the water-reducible blocked polyisocyanate and the hydroxy-functional polyurethane dispersion (R'—OH) occurs through the use of infrared and ultraviolet light coupled with heat generated by an artificial heat source (portable halogen light heat generator) to unblock the isocyanate groups and allow the traditional polyurethane reaction to take place. This curing mechanism is shown in Equation (3). When methyl ethyl ketoxime is used as a blocking agent or curing agent, a minimum baking cycle of 7 minutes at 140° C. may be required.

The process utilizes a number of metal oxides to bend the light wave reducing its heat signature, it achieves this by collecting photons and redistributing these across the surface of the coating. The coating material provides unique qualities such that the combination and ratios provide the unique energy dissipation characteristics.

It is to be noted that a common property of the polyol and reactive amine components is that they both contain "active" hydrogen atoms. The term "active hydrogen atoms" refers to hydrogens which, because of their position in the molecule, display activity according to the Zerewitinoff test. Accordingly, active hydrogens include hydrogen atoms attached to oxygen, nitrogen, or sulphur, and thus useful compounds will include —OH, —SH, —NH, and —NH2 groups in an appropriate combination.

The OH and SH functions are similar in properties and will therefore be included herein by terminology such as "diol" or "hydroxyl" groups. In other words, thiol and mercaptan groups are included in the above terminology. The hydrocarbon or substituted hydrocarbon moieties attached through the oxygen or sulphur to each "active hydrogen atom" group can be aliphatic, aromatic, cycloaliphatic or of a mixed type not including carbonyl, phosphoryl or sulfonic linkages.

The disclosure is not to be restricted to any particular acidic polyol inasmuch as combinations of acidic polyols may be utilized.

It will be generally preferred to utilize combinations of one or more acidic polyols blended with other non-acidic polyols to provide polyol blends having optimal performance characteristics.

The term polyol includes low molecular weight diols, triols and higher alcohols, low molecular weight amide-containing polyols and higher polymeric polyols such as polyester polyols, polyether polyols and hydroxy-containing acrylic copolymers.

The low molecular weight diols, triols and higher alcohols useful in the instant disclosure are known in the art. They have hydroxy values of 200 or above, usually within the range of 1500 to 200. Such materials include aliphatic polyols, particularly alkylene polyols containing from 2 to 18 carbon atoms. Examples include ethylene glycol, 1,2-propanediol, 1,3-propanediol, 1,4-butanediol, 1,6-hexanediol; cycloaliphic polyols such as 1,2-cycloexanediol and cyclohexane dimenthanol. Examples of triols and higher alcohols include trimethylol propane, glycerol and pentaerythritol. Also useful are polyols containing ether linkages such as diethylene glycol and triethylene glycol and oxyalkylated glycerol. Also useful are low molecular weight amide-containing polyols having hydroxyl values of 100 or above. When these low molecular weight amide-containing polyols are incorporated into the polymer, they enhance its water dispensability. Where flexible and elastomeric properties are desired a higher molecular weight polymeric polyol may be utilized. Suitable polymeric polyols include polyalkylene ether polyols including thio ethers, polyester polyols including polyhydroxy polyesteramides and hydroxyl-containing polycaprolactones and hydroxy-containing acrylic copolymers.

The acidic polyols and other polyol ingredients utilized are simply mixed together at a low speed to form the polyol phase. When blended in a zero VOC system, there is no need for utilizing a closed reactor with the ingredients being under a dry nitrogen blanket to exclude atmospheric moisture, as is required for the manufacturing of the above mentioned prior art aqueous aliphatic polyurethane dispersions. Although the polyols are mixed and blended in the presence of atmospheric moisture, this is not a problem because now the process is advantageously carried out in a zero VOC water-based system. When prepared, the polyol phase blend will be essentially 100% polyol, however minor amounts of solvent or water are not to be excluded. As noted above, the polyol will have an average hydroxyl functionality of at least 1.5 and preferably of at least 2 and will have an acid number of between about 15 and 200.

Amines

Any terminology used in distinguishing the various amines, i.e. neutralizing and chain-extending, is for purposes of identification and not classification. Some amines can function both as neutralizing agents and chain-extenders and to attempt to categorize each only according to function would not be accurate. However, an amine or combination of amines is necessary in the functioning of the disclosure. The presence of the amine is required to neutralize the acid in the polyol and convert it to a salt so it has water miscibility, solubility, or dispensability. Also, because of the active hydrogens, e.g. from amine hydrogens or hydroxyl groups on the amine, the amine can chain extend and crosslink the system by reacting with the isocyanate to form polyurethanes and polyureas.

Moreover, the combination of the acid polyol ingredient and the amine or amine blends functions as an efficient dispersant for all components in the two-component system, i.e. isocyanate and other polyols, and eliminates the need for the presence of an additional detergent or surface active agent to impart water solubility, emulsification or dispensability to the system.

The amines which can be employed in the neutralization of the acid function and reaction with the isocyanate in the preparation of the urethanes of the disclosure can be members selected from the group consisting of ammonia, primary and secondary aliphatic, cycloaliphatic and aromatic amines; tertiary aliphatic and aromatic amines; alkanol amines, dialkanol amines, trialkanol amines; polyamines, e.g. aliphatic, alicyclic and aromatic diamines, triamines and tetraamines, oxyalkyleneamines and poly(oxyalkylene)diamines and poly(oxyalkylene)triamines and mixtures thereof. Ammonia and amines not having an active hydrogen or having insufficient active hydrogens, e.g. tertiary alkyl amines, can be utilized for their neutralizing ability provided the overall amine blend has an average active hydrogen functionality of at least 1.5 and preferably of at least 2.

The following are exemplary of amines which may be utilized but is not intended to be an exhaustive listing. Representative of primary amines are C1 through C12 amines such as methylamine, ethylamine, propylamine, isopropylamine, 1,3-dimethylbutylamine, 3,3-dimethylbutylamine, 1-methylbutylamine, 2-methylbutylamine, 2-ethylbutylamine, isoamylamine, hexylamine, 1,5-dimethylhexylamine, 1,2-dimethylpropylamine, nonylamine, dodecylamine, cyclohexylamine, p-aminophenol and aniline.

Representative of secondary amines are diethyl amine, dipropylamine, diisopropylamine, dibutylamine, diisobutylamine, N-methylethylamine. N-methylbutylamine, N-ethylbutylamine, N-methylcyclohexylamine, N-methylaniline.

Exemplary tertiary amines triethylamine, trimethylamine, tripropylamine, triisopropylamine, tributylamine and methyldiethylamine. Those having active hydrogens include triethanolamine, triisopropanolamine, N-ethyldiethanolamine, N,N-dimethylethanolamine, N,N-diethylethanolamine, 3-diethylaminopropanol, 1,3-bis(dimethylamino)-2-propanol, 5-diethylamino-2-pentanol, 1-diethylamino-2-propanol, 2-(diethylamino)-1,2-propandiol, 2-(diisopropylamino) ethanol, 3-diisopropylamino-1,2-propandiol, 1-dimethylamino-2-propanol, 3-dimethylamino-1-propanol, 3-dimethylaminopropylamine and tris(3-aminopropyl)amine. The tertiary amines may also be classified as alkanol amines, diamines, etc.

Typical alkanol amines are ethanolamine, 2-amino-1-butanol, 4-amino-1-butanol, 2-aminoethanthiol, 2-amino-1-hexanol, 2-amino-3-methyl-1-butanol, 2-amino-2-methyl-1-propanol, 2-amino-2-methyl-1,3-propanediol, 5-amino-1-pentanol, 3-amino-1-propanol, 2-(methylamino)ethanol, 2-(propylamino)ethanol and tris(hydroxymethyl)aminomethane.

Representative dialkanol amines are diethanolamine, dipropanolamine, diisopropanolamine, di-n-butanolamine, diisobutanolamine, 1-[N,N-bis(2-hydroxyethyl)amino]-2-propanol and N-methyldiethanolamine.

Suitable trialkanol amines are trimethanelamine, triethanolamine, triisopropanolamine.

Exemplary of the aliphatic, alicyclic and aromatic diamines, triamines and tetraamines are the following. Suitable diamines may include ethylenediamine, hexamethylenediamine, 1,4-diaminobutane, 1,3-diaminopropane, 1,2-diaminopropane, 1,3-diaminopentane, 1,5-diaminopentane, 2-methylpentamethylenediamine, 1,7-diaminoheptane, 1,8-diaminooctane, 1,9-diaminononane, 1,10-diaminodecane, 1,12-diaminododecane, 1,3-diamino-2-hydroxypropane, 1,2-diamino-2-methylpropane, 3-(dibutylamine)propylamine, N-isopropylethylenediamine, N,N-dimethyl-N'-ethylenediamine, N,N'-dimethyl-1,6-hexanediamine, 2,5-dimethyl-2,5-hexanediamine, N-methylethylenediamine, N-methyl-1,3-propanediamine, N,N'-bis(2-aminoethyl)-1,3-propanediamine, N,N'-bis(3-aminopropyl)-1,3-propanediamine, N,N'-bis(2-hydroxyethyl)ethylenediamine, N-isopropyl-2-methyl-1,2-propandiamine, N,N-2,2-tetramethyl-1,3-propanediamine, isophorone diamine, propane-2,2-cyclohexyl amine, o-phenylene diamine, p-aminodiphenylamine, p-tolylene diamine, N,N'-dimethyl-o-phenylene diamine and N,N'-di-p-tolyl-m-phenylene diamine.

Representative triamines are diethylenetriamine and 3,3-diamino-N-methyldipropylamine. Typical of tetraamines is triethylenetetraamine.

The oxyalkyleneamines and poly(oxyalkylene) di- and triamines may be represented by 3-ethoxypropylamine, poly(oxyethylene)amines, poly(oxypropylene)amines, poly(oxyethylene)diamines, poly(oxypropylene)diamines, poly(oxyethylene)triamines and poly(oxypropylene)triamines. Particularly suitable are the poly(oxyalkylene)diamines and poly(oxyalkylene)triamines distributed by Huntsman Chemical Company under the Jeffamine trademark, e.g. Jeffamine M600, D230, D400, ED600, ED2001, ED4000, ED6000, DU700, T3000 and the like.

The various amine components are blended together in water (tap water is suitable) to form a blend having an amine content of between about 20-100 w/w %.

Addition of Amine and Polyol

The polyol and amine may be directly blended together at room temperature in an open vessel because there are no solvents to be concerned about.

There are various means or ways of formulating the polyol/amine component. Preferably the polyol phase is blended in a mixing tank with water containing any desired additives such as defoaming agents, surface tension reducing agents, agents to regulate pH (such as ammonia), etc. When utilized, any suitable defoaming agent or combination of agents, e.g. silicone or non-ionic acetylenic diols may be utilized and is not critical provided it is functional. This aqueous blend is formulated at room temperature. To this is blended the amine phase resulting in an overall polyol/amine component having a solids content of between about 33 and 80 w/w %. If desired, the amine components of the amine phase can be added sequentially. One particular advantage of the polyester-polyol/amine component is that the polyol blend and the amine blend can be formulated and shipped separately. These phases can then be blended with water at a suitable mixing site without the need of shipping water which can comprise over 50% of the final blend.

Forming a Film on Substrate from the Polyurethane-Polyurea Dispersions

A waterborne coating system as described herein can be applied to a hard surface, such as glass. When dried, the system forms a thin, hard coating or resin on the surface.

The water-based, solvent-free, multi-component polyurethane-polyurea dispersions, when applied to a substrate, cure to form a coating or film having properties of adhesion and bonding which are equal to or superior to films obtained from conventional solvent-based two-component polyurethane or epoxy systems. The film is a transparent water-based polymer with additives to absorb and/or reflect electromagnetic energy. The additives may include pigments of various colors such that the film is toned. The additives absorb near infrared energy.

The water-based coating system has no VOC or low VOC, and can include multi-component polyurethane-polyurea dispersions which can be fully cross-linked and chain extended in water. A blending of Part A (polyurethane-polyurea dispersions) with Part B (cross-linkers) can be applied to a hard surface, where Part B is added to Part A at a weight percent from 1% to 7%. A functional coating or permanent film can be formed on the hard surface.

The coating may provide flexibility to a hard surface to become highly reflective or highly absorbent of visual light. The sunlight shielding coating, with or without pigments, may be used to exhibit high visible transmittance and high sunlight shielding simultaneously.

The coating may reduce the heating effect of light radiation by a significant quantity. For example, the coating can reduce UV penetration from 90% to 99%, reduce near IR penetration from 50% to 70%, and reduce visible light from 20% to 70%. In certain applications this reduction may help prevent unwanted heating and cooling as a result of visible and non-visible light.

By separating UV light and IR light and measuring the reduction coefficient of a combination of IR reflectors and IR absorbers, it was found that a particular combination of co-doped metal oxides can provide a solar heat gain coefficient of less than 35 and provide a BTU reduction of 60%. There is no commercial coating product that can block light energy to demonstrate a reduction in heat coefficient from over 300 BTU to less than 100 BTU. The BTU reduction by using single absorber components is much lower than the combination of co-doped metal oxides.

In some embodiments, the cross-linked polyurethane film contains at least four IR absorbers and a UV absorber. The film is clear and very thin, ranging from 1 μm to 50 μm when cured, and preferably 30 μm or less. The film is flexible. For example, the film may be wrapped around a cylinder with angle exceed 270 degrees.

Analytical methods include surface analysis by infrared spectroscopy, solvent swelling studies, and stress-strain analysis. The analyses by using these analytical methods reveal that the coating is a very homogeneous network.

Method of Applying Coating on Vertical Structure

The film may help improve how people manage in a non-air conditioned and a high solar capacity environment by absorbing fractions of IR and UV radiation.

The coating can be sprayed, poured, or rolled on a surface. The coating can also be applied via a print mechanism and physically rolled over the surface.

The coating may be formed on a glass or a plastic structure. Plastics, including polycarbonate, Plexiglas, and the like, may be used as a window material. The coating may also be formed on a building material, a vehicle, a booth, or the like. The coating may be applied to a system that requires high transmittance in a visible light region such that there would be no loss of usable light. The coating may also be applied to a system that requires reduction of visible light from 30% to 60%, or other ranges, for example, from 20% to 70%, or from 10% to 80%. The coating is very thin, for example, from 2 μm to 50 μm, depending upon a specific need.

A solvent free aqueous dispersion, including the first composition A and the second composition B, when applied to a substrate, cures to form a coating or a thin film having significant properties of adhesion and bonding flexibility.

Example Water-Based Polyurethane Dispersion

Table 3 shows example compositions of water-based polyurethane and additives.

TABLE 3

Compositions of Example Water-based Polyurethane Dispersion Including Crosslinkers

| Component A | Example | Chemical structure | % Wt./Wt | Supplier |
| --- | --- | --- | --- | --- |
| PUD's | Bayhydrol VP LS 2235/1 | $C_{25}H_{42}N_2O_6$ | 29.07 | Bayer AG |
| Surfactant | Surfynol 104E | $C_{15}H_{24}C_2H_6O_2$ | 0.18 | Air Products & Chemicals, Inc. |
| Dispersant Sodium Polyacrylate | Orotan 681 | $C_3H_3NaO_2$ | 0.44 | Rohm and Haas Deutschland GmbH |
| Levelling component Mono propylene glycol | Bevaloid | $C_3H_8O_2$ | 0.18 | C.H. Erbsloh JG |
| Pigment | Green - GN-M | | 4.09 | Bayer AG |
| Pigment | Holtatint oxide black | | 0.52 | Clarient |
| Near IR absorber | Micro-Talkum A.T.1 | $(Zr(WO_4)_2$ | 0.02 | Norwegian Talc, Ltd. |
| Near IR absorber | Indium tin Oxide | $InO_3SnO_2$ | 0.36 | American Elements |

TABLE 3-continued

Compositions of Example Water-based Polyurethane Dispersion Including Crosslinkers

| Component A | Example | Chemical structure | % Wt./Wt | Supplier |
|---|---|---|---|---|
| Near IR absorber | Antimony tin Oxide | $Sb_2SnO_5$ | 0.56 | American Elements |
| Near IR absorber | Cerium Oxide | $C_3O_2$ | 0.26 | American Elements |
| UV absorber | Tinuvin | | 1.26 | BASF GmbH |
| Water | Ionized water | $H_2O$ | 62.33 | |
| Crosslinker or curing agent | isophorone diisocyanate, IPDI), and 4,4'-diisocyanato dicyclohexylmethane | $C_{12}H_{18}N_2O_2$ | 2.73 | Bayer AG |
| Total | | | 100 | |

Table 4 shows the contents of the dispersion of Table 3. As shown in Table 4, the dispersion includes a pigment ranging from 15.5% to 41.9 w/w %. The dispersion also includes polyols ranging from 10.6% to 34 w/w %. The dispersion has a total solid content ranging from 31.6% to 75.5 w/w % and a VOC ranging from 30.2 to 68.5 g/L.

TABLE 4

| Contents of the Dispersion | |
|---|---|
| % Pigment/Wt. | 15.5 to 41.9 |
| % Pigment/Vol. | 10.1 to 21.4 |
| % solids/Wt. | 31.6 to 75.5 |
| % solids/Vol. | 40.4 to 63.6 |
| % Polyols | 10.6 to 34.0 |
| VOC g/L | 30.2 to 68.5 |

Table 5A shows the properties of the dispersion of Table 3. As shown in Table 5A, the first composition has a Stormer viscosity ranging from 95-105 KU at 25° C. The dispersion including the first composition (Part A) and the second composition (Part B-crosslinker) has a Stormer viscosity of 85-95 KU at 25° C. The dispersion has a density of 1266.92 g/L and a PH value ranging from 8.25-8.75 at 25° C. The dispersion also has a pot life of about 3 days. Table 5B shows the viscosity with addition of water. Table 5B shows the viscosity with addition of crosslinkers.

The Brookfield din cup is an instrument used to measure viscosity when the polymer contains the finished formula of the non-soluble nano co-doped metal oxidesand. The instrument is used widely for making viscosity measurements on paints/coatings in accordance with ASTM D562. The features and benefits include (1) Continuous sensing and display in Krebs units, grams, and centipoise; (2) Rapidly measure sample to determine required consistency; (3) LED Digital Display in Krebs Units (increased resolution in 0.1 KU increments), grams (in 1 mg increments), and centipoise (cP). The instrument also has an expanded measurement range (40 to 141 KU; 32 to 1099 g; 27 to 5274 cP), an accuracy to ±1% of full scale range, a reproducibility to ±0.5% of full scale range. It is easy to use and has minimum weights. It is also compatible with industry specification (ASTM D562). The instrument is typically used for measurements on paints, coatings, adhesives, inks or pastes.

TABLE 5A

| Properties of the Dispersion | |
|---|---|
| Density | 1266.92 g/L |
| Brookfield din cup 2 | 180 seconds |
| Part A Stormer Viscosity at 25° C. | 95-105 KU |
| Part A + B Stormer Viscosity at 25° C. | 85-95 KU |
| PH value at 25° C. | 8.25-8.75 |
| Pot Life | 3 days |
| Recommended D.F.T. | 40 μm |
| Minimum cure ratio by Wt. (Composition A to Composition B) | 97.2:2.7 |

TABLE 5B

| Viscosity of the Dispersion with Addition of Water | |
|---|---|
| Addition of Water to adjust (wt %) | Stormer Viscosity (KU) |
| 0 | 105.4 |
| 0.17 | 104.4 |
| 0.35 | 103.2 |
| 0.53 | 102.1 |
| 0.7 | 99.2 |
| 1.97 | 95.9 |

TABLE 5C

| Viscosity of the Dispersion with Addition of Crosslinker | |
|---|---|
| Addition of crosslinker (wt %) | Stormer Viscosity (KU) |
| 0 | 95.9 |
| 0.18 | 92.8 |
| 0.34 | 91.2 |
| 0.52 | 90.9 |
| 0.69 | 89.2 |
| 1.97 | 85 |

The mixing time at high speed for the first composition A including polymer dispersion, additives, such as surfactant, dispersant, levelling components, pigments, IR absorbers, or UV absorbers, may be about 120 minutes and followed by slowly dispersing the mixture for about 110 minutes, using a planetary ball mill to 200 nm, but do not aerate.

In some variations, one or more cross-linkers that are organic-solvent soluble can be used. In various embodiments, because the organic-solvent soluble evaporate quickly, such cross-linkers can be used for rapid curing of the resin. Any organic-solvent soluble solvent that is miscible in water can be used. Examples of such crosslinkers include $H_{12}MDI$ (W) and IPDI (I). As an example, films were prepared by adding the two resins at an NCO:OH ratio of 1:1. To study the effect of the monomer on the final film properties, two waterborne coating systems were evaluated and have been given the following designation: W and I based upon Table 6 (isocyanate/polyol). These systems are based solely on polymers of $H_{12}MDI$ (W) and IPDI (I), respectively. For each coating formulation, 0.2% Silquest A 189 (OSi Specialties) and 0.2% Dynasylan AMEO (Hills) adhesion promoters were added. Dipropylene glycol was added at 1.6% to ensure optimum appearance of the film. The coatings were cured for 30 minutes at 160° C. It should be noted that these coatings can be either spray or dip applied.

TABLE 6

Blocked Water-Reducible Polyisocyanate

| Blocked Polyisocyanate | Monomer Basis | % NCO (blocked) | Blocking Agent | Viscosity mPa * s |
|---|---|---|---|---|
| W | $H_{12}MDI$ | 2.5 | Methyl ethyl ketoxime | 34* |
| I | IPDI | 2.7 | Methyl ethyl ketoxime | 49* |

35% solids content by weight

Coatings based solely on H12MDI (W) were then tested for pendulum hardness, yellowing, water resistance and NaOH resistance. These coatings were baked at temperatures ranging from 140–220° C. for 10, 20 and 30 minutes, respectively, to determine the optimal curing schedule.

When working with waterborne coatings, a key question is whether the proven performance of current two-component solvent borne systems can be achieved or exceeded. An aliphatic polyurethane solvent borne system based on HDI-based trimmer and a blend of hydroxy-functional polyesters was used throughout this study as a comparison. This system is designated 2K-PUR and contains the same silane adhesion promoters as the waterborne system.

Film Hardness

Normally, when curing methyl ethyl ketoxime blocked polyisocyanate, an infrared bake of 140° C. for 15 minutes is required to unblock the polyisocyanate and allow cure.

The effect of baking temperature vs. baking time was examined to determine when each system reached its maximum pendulum hardness. The results are shown in FIG. 1.

These results indicate that the system based on H12MDI (W) reaches a maximum pendulum hardness at a lower temperature than the blocked IPDI (I) coating.

This is consistent with what was reported in the literature for H12MDI blocked polyisocyanates. Moreover, the pendulum hardness increases as the baking temperature increases.

Figure 2:
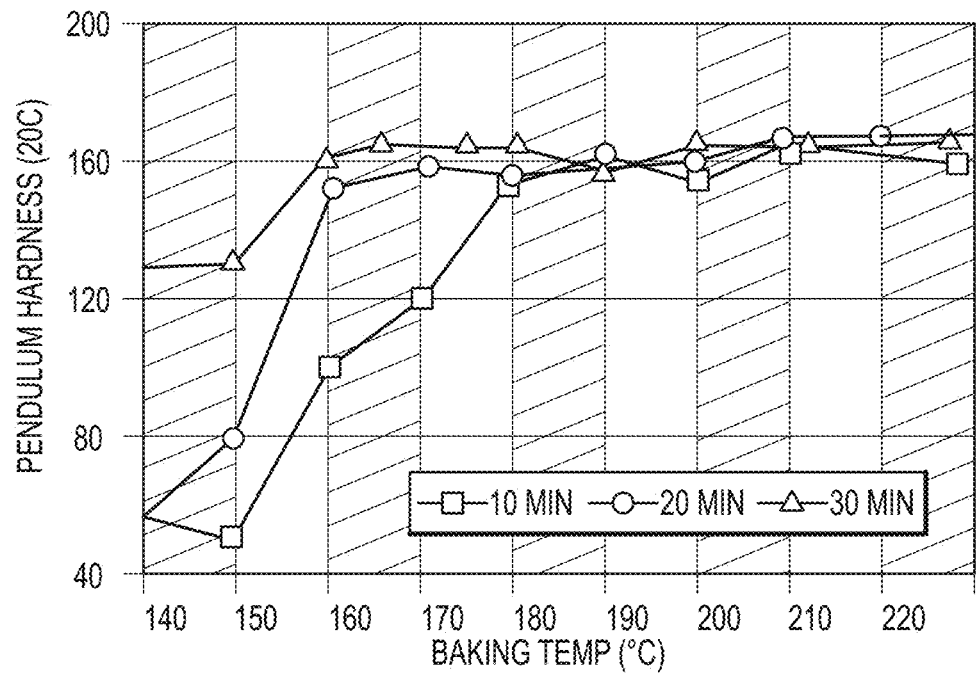
FIG. 2 shows Koenig Pendulum hardness results for water-based system for different baking schedules in accordance with embodiments of the present disclosure.

Pendulum hardness tests were performed on the H12MDI (W) based coatings to determine the temperature/baking time relationship for this system. These results are shown in FIG. 2.

From this figure, it can be concluded that a maximum pendulum hardness of approximately 160 seconds can be reached by baking the H12MDI-based system at higher temperatures or longer periods of time. This system reaches a maximum pendulum hardness of approximately 160 seconds after baking the coated glass panels according to one of the following baking schedules: 10 minutes at 190° C., 20 minutes at 170° C. or 30 minutes at 160° C. Therefore, one can choose the necessary curing schedule for the H12MDI (W) system by adjusting the baking time or temperature.

Abrasion Resistance

In addition to the hardness of the films, the abrasion resistance of each system was evaluated. The films were cured at 160° C. for 30 minutes. The system, based upon H12MDI showed improved abrasion resistance compared to both the IPDI and the solvent borne 2K PUR coating formulated for this study. This attribute is essential for the development of a glass coating system.

Water Resistance

To test the effect of water on the cured films and to compare adhesion loss, coated glass panels were placed in a heated water bath (40° C.) for 10 days. After 10 days, the 2K-PUR system exhibited slight micro-bubble formation that was not evident on the waterborne films. The IPDI based system (I) showed a decrease in hardness and higher sensitivity to scratching that was not observed with the W system. These results support the claim that the structure of H12MDI provides added protection of a coating system to hydrolysis.[9,11]

These test results also correlate with the results obtained after exposing the W coated panels to 100 cycles in a typical household dishwasher. After this testing, the coated panels showed no signs of degradation. This again points to the fact that polyurethane resins based on H12MDI are suited for coating glass to meet the harsh demands of the industry.

In addition, a baking temperature/time study was performed to determine the optimal cure schedule for the water resistance of the W system. The coated glass panels were baked at temperatures ranging from 140-220° C. for 10, 20 and 30 minutes, respectively. The panels were then immersed in water at 40° C. for seven and 14 days. The crosshatch adhesion test was then performed on the coating, and the results were reported in terms of percent adhesion loss. The results of this test are shown in Table 7.

TABLE 7

OH Functional Waterborne Polyurethane Dispersion

| OH-Polyurethane Dispersion | Monomer Basis | % OH | Viscosity mPa * s |
|---|---|---|---|
| W | $H_{12}MDI$ | 1.6 | 4710* |
| I | IPDI | 1.7 | 120* |

35% solids content by weight

Data in the table indicate that after 14 days of water immersion at 40° C., 0% adhesion loss can be achieved if the system is baked for 20 or 30 minutes at 160° C. Also, the seven-day immersion data indicate that excellent adhesion is achieved by baking the system at 180° C. for 10 minutes, or 160° C. for 20 or 30 minutes, respectively.

NaOH Resistance

In some instances, the surface is a glass. Since many glass objects must be sterilized before use, a glass coating must be highly resistant to caustic solutions. To determine the sodium hydroxide resistance of the new system, the W-based coated panels were baked at temperatures ranging from 140-220° C. for 10, 20 and 30 minutes, respectively. The panels were then immersed in a NaOH bath (5%) at 70° C. for four and 24 hours. The coatings were then evaluated for crosshatch adhesion. The data in the table indicate that after four hours of exposure to 5% NaOH solution at 70° C., the W system attained 0% adhesion loss after baking at 180° C. for 20 or 30 minutes, or 190° C. for 10 minutes, respectively.

In addition, when immersing the W-based system in the NaOH solution for 24 hours, 0% adhesion loss can be achieved by using one of the following baking schedules: 30 minutes at 180° C., 20 minutes at 190° C., or 10 minutes at 210° C., respectively.

Other chemical resistance for the coating are listed in Table 8.

TABLE 8

CHEMICAL RESISTANCE TABLE

| | |
|---|---|
| Acetic Acid 20% | B |
| Acetone | C |
| Aluminum Chloride | B |
| Aluminum sulfate | B |
| Aluminum sulfide | B |
| Ammonia, anhydrous | T |
| Ammonium hydroxide | A |
| Amonium thiocyanide | B |
| Antimony salts | B |
| ASTM hydrocarbon test fluid | T |
| ASTM oil #1 (158° F.) | A |
| ASTM oil #3 (158° F.) | B |
| ASTM reference fuel A | A |
| ASTM reference fuel B (122° F.) | B |
| ASTM reference fuel C | C |
| Barium hydroxide | A |
| Benzene | C |
| Borax | A |
| Boric Acid | A |
| Butane | A |
| Calcium bisulfite | A |
| Calcium chloride | A |
| Calcium hydroxide | A |
| Calcium hypochlorite (5%) | X |
| Carbon dioxide | A |
| Carbon monoxide | A |
| Carbon Tetrachloride | C |
| Castor oil | A |
| Chlorine gas (dry) | X |
| Chlorine gas (wet) | C |
| Chromic acid (10-50%) | C |
| Copper chloride | A |
| Copper nitrate | B |
| Copper sulfate | A |
| Cottnseed oil | A |
| Cyclohexane | A |
| DOWTHERN A | B |
| Ethyl acetate | C |
| Ethyl alcohol | C |
| Ethylene glycol | B |
| Ferric chloride | B |
| Ferric nitrate | B |
| Ferrous chloride | B |
| Ferrous sulphate | B |
| Formaldehyde (37%) | C |
| Formic acid | C |
| FREON-11 | B |
| FREON-12 (130 F./54 C.) | A |
| FREON-22 | C |
| FREON-113 | A |
| FREON-114 | T |
| Fuel oil | B |
| Gasoline | B |
| Glue | A |
| Glycerin | A |
| n-Hexane (122 F./50 C.) | B |
| Hydraulic oils | B |
| Hydrochloric acid (20%) | B |
| Hydrochloric acid (37%) | C |
| Hydrocyanic acid | B |

TABLE 8-continued

CHEMICAL RESISTANCE TABLE

| | |
|---|---|
| Hydrogen | A |
| Hydrogen Peroxide (90%) | T |
| Isooctane (158 F./79 C.) | B |
| Isopropyl ether | B |
| JP-4 | B |
| JP-5 | C |
| JP-6 | C |
| Kerosene | B |
| Lacquer solvents | X |
| Linseed oil | B |
| Lubricating oils | B |
| Magnesium chloride | A |
| Magnesium hydroxide | A |
| Mercury | A |
| Methyl Alcohol | C |
| Methyl ethyl ketone | C |
| Methyl pyrrolidine | C |
| Mineral oil | A |
| Naptha | B |
| Nathalene | B |
| Nickel salts | B-C |
| Nitric acid (10%) | C |
| Oleic acid | B |
| Palmitic acid | A |
| Perchloroethylene | C |
| Phenol | C |
| Phosphoric acid (10-70%) | A |
| Phosphoric acid (85%) | C |
| Potassium cyanide | B |
| Potassim hydroxide | B |
| SAE #10 oil (158 F./70 C.) | A |
| Sea water | A |
| Silver nitrate | B |
| SKYDROL 500 | C |
| Soap | A |
| Sodium cyanide | B |
| Sodium hydroxide (20%) | A |
| Sodium hydroxide (46.5%) | B |
| Sodium hypochlorite (20%) | C |
| Sodium hypochlorite (5%) | C |
| Soybean oil | B |
| Stearic acid | A |
| Sulfur dioxide (liquid) | T |
| Sulfur dioxide (gas) | T |
| Sulfur trioxide | T |
| Sulfuric acid (5-10%) | C |
| Sulfuric acid (10-50%) | C |
| Sulfuric acid (50-80%) | C |
| Sulfurous acid | C |
| Tannic acid (10%) | A |
| Tartaric acid | A |
| Tin salts | B |
| Titanium salts | B |
| Toluene | C |
| Trichloroethlene | C |
| Tricresyl phosphate | B |
| Trisodium phosphate | A |
| Tung oil | B |
| Turpentine | C |
| Water (120 F./48 C.) | A |
| Water (212 F./100 C.) | C |
| Xylene | C |

Figure 3:
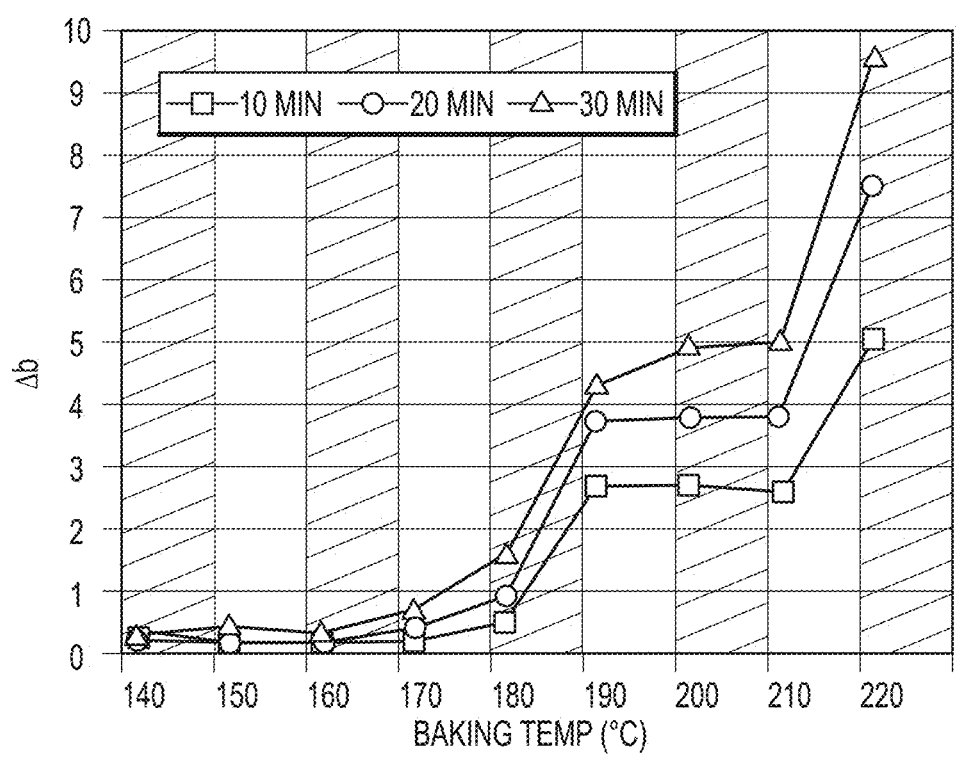
FIG. 3 shows yellowing versus baking schedule in accordance with embodiments of the present disclosure.

TABLE KEY
A = Little or no effect
B = Minor to moderate effect
C = Severe effect to complete destruction
T = Test before using. No data but most likely to be satisfactory
X = No data but most likely to be unsatisfactory Yellowing in Relationship to the Baking Schedule One objective was to determine the yellowing/baking temperature relationship of the W system. FIG. 3 shows the time/temperature relationship of this system.

Yellowing of the coating is directly correlated to both baking time and temperature. The longer the exposure time and higher the temperature, the more severe the yellowing. Yellowing is minimal when using baking temperatures lower than 180° C., corresponding to delta b values of 2 or less from the spectrophotometer measurements.

EXAMPLES

The following examples 1-10 provide details on how to form a coating on a hard surface. The material ratios vary in various examples. Some material properties are provided, including the pot life of the mixture, viscosity of polyol, and properties of the coatings, such as hardness, solvent resistance, water resistance, coating clarity.

Example 1

An acidic polyester-polyol (hexanediol neopentyl glycol adipate) partially reacted with trimellitic anhydride was utilized. The polyol had an average molecular weight of about 1500 and contains both carboxylic acid and hydroxyl sites. The polyol had an average molecular weight of about 1250, an acid value of about 50, a hydroxyl value of about 66, and a ratio of hydroxyl/acid functionality of about 1.8:1.3. The polyol was a pale waxy liquid having a viscosity of about 28,000 cps at 25° C. and a viscosity of about 2,700 cps at 60° C. For purposes of description, this acidic polyester-polyol is referred to simply as "Polyol A".

A 50/50 by weight polyol/water blend including 50 grams of Polyol A was diluted with 50 mls of water. About 6 grams of triethanol amine having an average molecular weight of 149 was added to the 50/50 polyol/water blend. An equivalent acid to amine ratio of 1:1 may provide sufficient amine to neutralize the acid function of the polyol.

To the polyol/amine blend was added 40 grams of 100% solid isocyanurate trimmer of hexamethylene diisocyanate having an average molecular weight of about 181, thereby supplying sufficient NCO equivalents to provide a NCO/active hydrogen ratio of about 1.2:1. The resulting mixture was an aqueous polyurethane dispersion or polyurethane-polyurea dispersion having a pot life in excess of two hours. When coated on a substrate, the blend had a tack free dry time of about 5-7 hours and may be fully cured in 1-2 days at an ambient temperature, and the coating had a pencil hardness of about 1 HB. The cured coating showed solvent resistance in the range of about 300-500 MEK rubs and a moderate water resistance when immersed in water at an ambient temperature. The coating turned yellow upon heating at 82.22° C.

Example 2

Example 1 was repeated utilizing 4 grams of diethanol amine (average molecular weight of 105) to provide an equivalent acid to amine ratio of about 1:1. About 48 grams of the isocyanate trimmer of Example 1 was used to provide an NCO/active hydrogen ratio of about 1.5:1, with all other conditions being the same. The resulting mixture was an aqueous polyurethane dispersion having a pot life in excess of three hours. When coated on a substrate, the blend had a tack free dry time of about 6-8 hours, and the coating had a pencil hardness of 1 F. The cured coating also showed a solvent resistance of about 300-500 MEK rubs and a moderate water resistance when immersed in water at an ambient temperature. The coating also remained clear upon heating at 82.22° C.

Example 3

Example 1 was repeated utilizing 2 grams of 2-methyl-1,5-diaminopentane (MDP) (average molecular weight of 58) as the amine to provide an equivalent acid to amine ratio of about 1:1. About 26 grams of the isocyanate trimmer of Example 1 was used to provide an NCO/active hydrogen ratio of about 1.5:1, with all other conditions being the same. The resulting mixture was an aqueous polyurethane dispersion having a pot life of less than one hour. When coated on a substrate, the blend had a tack free dry time of about 4 hours, which resulted in a pencil hardness of 1H for the coating. The cured coating showed a solvent resistance in excess of 500 MEK rubs and a moderate water resistance when immersed in water at an ambient temperature. The coating also remained clear upon heating at 180° F.

Example 4

Example 1 was repeated utilizing a combination of 0.2 grams of 2-methyl-1,5-diaminopentane (MDP) (average molecular weight 58) and 3.0 grams of 28% ammonium hydroxide (average molecular weight 17) as the amine to provide an equivalent acid/amine ration of about 0.7:1. About 30 grams of the isocyanate trimmer of Example 1 was used to provide and NCO/active hydrogen ratio of about 1.5:1, with all other conditions being the same. The resulting mixture was an aqueous polyurethane dispersion having a pot life of about 2 hours. When coated on a substrate, the blend had a tack free dry time of about 6 hours, resulting in a pencil hardness of about 1 HB for the coating. The coating showed a solvent resistance of about 300-500 MEK rubs and a moderate water resistance when immersed in water at an ambient temperature. The coating also remained clear upon heating at 82.22° C.

Example 5

Example 1 was repeated utilizing a combination of 2.8 grams of 2-amino-2-methylpropanol (AMP) (average molecular weight of 45) and 0.2 grams of 2-methyl-1,5-diaminopentane (MDP) (average molecular weight of 58) as the amine to provide an acid to amine ratio of about 0.6:1. About 35 grams of the isocyanate trimmer of Example 1 was used to provide and NCO/active hydrogen ratio of about 1.5:1, with all other conditions being the same. The resulting mixture was an aqueous polyurethane dispersion having a pot life of 2-3 hours. When coated on a substrate, the blend had a tack free dry time of about 6 hours, resulting in a pencil hardness of about 1B for the coating. The cured coating showed a solvent resistance of about 300-500 MEK rubs and a good water resistance when immersed in water at an ambient temperature. The coating also remained clear upon heating at 82.22° C.

Example 6

An aqueous polyol blend was made by combining 29 parts by weight of Polyol A, 25 parts by weight of a nonacidic polyester-polyol (King K-Flex 188) having an average molecular weight of 238, 1 part by weight of an amine blend (Amine A) made up of 50% diethanol amine, 10% MDP and 40% AMP, 1.3 parts by weight of 28% ammonium hydroxide, 5 parts by weight trimethylol propane (TMP), 0.5 parts by weight of an polyoxypropylenetriamine having a molecular weight of about 3000 (Jeffamine 3000), 36.2 parts by weight water, 1.0 part by weight of a UV stabilizer mixture (CIBA TINUVIN 292 and 1130), and 1.0 part by weight of a surfactant/defoamer mixture (Byk 346 Surfactant, Deefo defoamer). This blend had an acid equivalence of 0.023 and an amine equivalence of 0.026 so that there was a slight excess of amine to neutralize the acid function and an active hydrogen equivalence of about 0.25.

A white pigmented solution was prepared by paint milling a mixture of about 55 parts by weight of the above polyol/amine with 28 parts by weight of white pigment $TiO_2$, 16 parts by weight water, and 1.0 parts by weight of a surfactant mixture. One hundred parts of the pigmented polyol/amine blend was then combined with 50 parts by weight of the isocyanurate trimmer of Example 1, resulting in an NCO/active hydrogen ratio of about 2:1.

This dispersion had a pot life of about 3.5 hours. A coating was formed on a substrate using this dispersion, and had a tack free drying time of between about 4-5 hours. The coating was cured by air dry, and had a pencil hardness of 3H. The coating also showed a solvent resistance of over 2000 MEK rubs and an excellent water resistance when immersed in water for seven days at an ambient temperature. The coating did not turn yellow upon heating at 180° F. and showed excellent gloss retention in accelerated UV stability tests.

Example 7

To 100 parts of the pigmented polyol/amine blend of Example 6 was combined 45 parts of a biuret trimmer of hexamethylene diisocyanate (Miles N3200), resulting in a sprayable coating with an NCO/active hydrogen ratio of about 2:1. This dispersion had a pot life of about 2.5 hours and a tack free drying time of 4-5 hours. The cured film properties were almost equivalent to the values reported in Example 6.

Example 8

An aqueous polyol blend was made by combining 29 parts by weight of Polyol A, 25 parts by weight of a nonacidic polyester-polyol (King K-Flex 165) having an average molecular weight of 238, 1.5 parts by weight of an amine blend (Amine B) made up of 30% triethanol amine, 40% MDP and 30% AMP, 1.3 parts by weight of 28% ammonium hydroxide, 5 parts by weight trimethylol propane (TMP), 36.18 parts by weight water, 1.0 part by weight of a UV stabilizer mixture (CIBA TINU7IN 292 and 1130), 1.0 part by weight of a flow control additive mixture (3M FC-120 Surfactant, Air Products DF574 Defoamer), and 0.02 parts of a tin catalyst [T12(DBTLD)]. This blend had an acid equivalence of 0.023, and amine equivalence of 0.030 so that there was an excess of amine to neutralize the acid function, and an active hydrogen equivalence of about 0.25.

A white pigmented solution was prepared by combining about 55 parts by weight of the above polyol/amine with 28 parts by weight of $TiO_2$, 16 parts by weight water, and 1.0 parts by weight of a surfactant mixture. One hundred parts of the pigmented polyol/amine blend was then combined with 50 parts by weight of the isocyanurate trimmer of Example 1, resulting in an NCO/active hydrogen ratio of about 2:1.

This dispersion had a pot life of about 2.5 hours. A coating formed from this dispersion on a substrate had a tack free drying time of between about 5 and 7 hours. The coating had a pencil hardness of 3-4H. The coating showed a solvent resistance of over 3000 MEK rubs and an excellent water resistance when immersed in water for seven days at an ambient temperature. The coating did not yellow upon heating at 82.22° C. and showed excellent gloss retention in accelerated UV stability tests.

Example 9

An aqueous polyol blend was made by combining 26.4 parts by weight of Polyol A, 13 parts by weight of a nonacidic aromatic polyester-diol (Stephan 4000) having an average molecular weight of 140, 1.5 parts by weight of an amine blend (Amine C) made up of 35% triethanol amine, 10% diethanol amine, 25% 1,3-pentanediamine and 30% AMP, 0.8 parts by weight of 28% ammonium hydroxide, 11 parts by weight trimethylol propane (TMP), 4.4 parts by weight of an polyoxypropylenetriamine having a molecular weight of about 3000 (Jeffamine 3000), 41.73 parts by weight water, 1.15 parts by weight of a surfactant/defoamer mixture (Byk 364 Surfactant, DF574), and 0.02 parts by weight of a tin catalyst [T12(DBTDL)]. This blend had an acid equivalence of 0.021 and an amine equivalence of 0.026 so that there was an acid/amine ratio of 0.8:1 providing an excess of amine to neutralize the acid function, and an active hydrogen equivalence of about 0.37.

A black pigmented solution was prepared by paint milling a mixture of about 100 parts by weight of the above polyol/amine and 25 parts of an acid functional acrylic resin (Cook Chemical—Chempol 4301), 20 parts water, and 10 parts by weight of a black pigment dispersion (Huls 896 W/B). One hundred parts of the pigmented polyol/amine blend was then combined with 50 parts by weight of the isocyanurate trimmer of Example 1 resulting in an NCO/active hydrogen ratio of about 2:1.

This dispersion had a pot life of about 1.25-2 hours. A coating formed from this dispersion on a substrate had a tack free drying time of between about 4 and 5 hours. The coating had a pensile hardness of 3-4 H. The cured coating showed a solvent resistance of over 2000 MEK rubs and an excellent water resistance when immersed in water for seven days at an ambient temperature. The coating also showed excellent gloss retention when heated at 82.22° C.

Example 10

A two litre reaction vessel, equipped with a mechanical stirrer, nitrogen atmosphere, heating and cooling system, and a water separator, was charged with 1000 g of Ruco polyester diol, including neopentyl glycol, hexanediol, and adipic acid, having an average molecular weight of about 1000 and a hydroxyl number of 65. The polyol was heated to 65.5° C. with stirring and then about 100 g of dimethylolpropionic acid and 0.5 g of p-toluenesulfonic acid catalyst were added. The temperature was increased to 260° F. over 30 minutes and was maintained at that temperature for about 10 hours, while a slow nitrogen purge was maintained and about 10-12 g of water was collected in a cold trap. The reaction mixture was cooled to 82.22° C. and an acid number was run on the product. Typically about 10 g aliquot of succinic anhydride was added and the mixture was heated until the acid number was in the 45-50 range and the hydroxyl number was about 60.

A polyol amine blend, similar to that shown in Example 6, was prepared using 30 g of the above dimethylolpropionic acid containing polyester diol in place of Polyol A. This was combined with 20 g of an aliphatic polyester polyol (K-Flex 188), 1.5 g of an amine blend made up of 34% triethanolamine, 33% MDP and 33% AMP, 1.4 g of 28% ammonium hydroxide, 8 g of trimethylol propane, 37 g of water, 1 g of a UV stabilizer (Tinuvin 292) and 1 g of a surfactant/ defoamer mixture. The blend had an acid equivalence of 0.025, an amine equivalence of 0.045 and an active hydrogen equivalence of about 0.35.

A clear coating was prepared by combining 100 parts of the above polyol/amine blend with 80 parts of the isocyanurate trimmer of hexamethylene diisocyanate used in Example 1, such that the NCO/active hydrogen equivalence was 1.25:1. The resulting emulsion was reduced with 80 parts of water to afford a low viscosity dispersion with a solids content of about 54% and a pot life of at least 8 hours. A coating of this dispersion formed on a metal substrate dried tack-free within 4-6 hours and was fully cured at ambient condition in 1-2 days. The resulting film had a pencil hardness of 1-2H, a solvent resistance of at least 500 MEK rubs, and remained colorless in QUV and 73.3° C. heat aging tests. The QUV accelerated weathering tester reproduces the damage caused by sunlight, rain and dew. In a few days or weeks, the QUV UV tester can reproduce the damage that occurs over months or years outdoors. To simulate outdoor weathering, the QUV tester exposes materials to alternating cycles of UV light and moisture at controlled, elevated temperatures. It simulates the effects of sunlight using special fluorescent UV lamps. It simulates dew and rain with condensing humidity and/or water spray.

Methods for Preparing Co-Doped Metal Oxides

In some embodiments, the active material in the heat dissipating absorbers forms an active nano structure, which is a co-doped synthesized antimony tin oxide nano structure.

In some embodiments, the active material in the heat dissipating absorbers forms an active nano structure, which is a co-doped synthesized metal oxide nano structure, such as co-doped metal oxides that includes two or more of $WO_2$, $CeO_2$, $SiO_2$, $SbO_3$, $Ag_2O$, and $SnO_2$ among others.

In some embodiments, a method is provided to synthesize tin and antimony to form antimony tin oxide (ATO). The method includes bead milling for reducing the particles to the desired nano sizes.

In some embodiments, the method for preparation of a co-doped metal oxide composition may include oxidizing a substance composed of intimately mixed tin powders and antimony powders with nitric acid to produce a composition of nitrates, which may then be precipitated using an oxidative reaction of urea and calcium hydroxide to form co-doped metal oxide structures having a particle size not over 0.5 mm with a ratio of tin to antimony in the range of 1 to 10. The co-doped structures may be washed and heated at a temperature of about 160° C. to produce a synthesized ATO structure. This method can be used for other oxides including two or more of $WO_2$, $CeO_2$, $SiO_2$, $SbO_3$, $Ag_2O$, and $SnO_2$ to produce a synthesized metal oxide structure.

The disclosure provides methods for reducing the size of particles from 0.4 mm to a nano size of 50 µm up to 200 µm. The nano sized particles or crystals are functional co-doped particles.

The co-doped nano particles or crystals can be incorporated into a polymer binder to provide a photon absorbing structure that dissipates the heat from IR and UV radiation and transmits visible light.

Conventionally, the synthesized nano structure may be prepared by separately oxidizing each of the metals to obtain a slurry of tin oxides and a slurry of antimony oxides. The two slurries may be blended together and then dried. The dried slurries may then be washed with water and filtered to obtain a mixture of fine particles of the oxides. This mixture may then be agglomerated after simple drying, and then subjected to a heat treatment at an elevated temperature from 700° C. to 800° C. Such heat treatment can cause a reaction between the oxides. However, the oxides are not co-doped. The co-doped structure can be achieved by synthesis using a solution method including a nitric acid dissolving, and may be reduced using urea and calcium hydroxide.

The co-doped structure can be achieved by synthesis using a solution method including a nitric acid dissolving process to create a primary co-doped metal oxide structure containing at least one metalloid group metals and one transition metal and may be reduced by a Redox reactions, or oxidation-reduction reactions, have a number of similarities to acid-base reactions. Like acid-base reactions, redox reactions are a matched set, that is, there cannot be an oxidation reaction without a reduction reaction happening simultaneously. The oxidation alone and the reduction alone are each called a half-reaction, because two half-reactions always occur together to form a whole reaction. When writing half-reactions, the gained or lost electrons are typically included explicitly in order that the half-reaction be balanced with respect to electric charge. Using urea and calcium hydroxide.

The co-doped metal oxides prepared in the conventional method have some disadvantages in that they require heat treatments at high temperatures at the end of the process, and also require specific contact periods with reactants carrying out various reactions in order to create the desired particle size.

The metal oxides may be prepared by oxidizing intimately or well mixed tin oxide powder and antimony oxide powder with nitric acid at 70° C. to 120° C. After the nitrification, an additional oxidation phase may be required. Then, the mixture may be washed and dried at about 100° C. to 160° C. The mixture of tungsten oxide, cerium oxide, silicon oxide, and indium oxide with antimony tin oxide may be formed of particles of tin oxide and antimony oxide co-doped with tungsten oxide, cerium oxide, silicon oxide, and indium oxide having a particle size not over 0.5 mm.

It may be insufficient to react the mixture of the metal oxides and antimony oxide powder with nitric acid. The mixture must be an intimate mixture. Instead of mixing the powders, particle size of the oxides may be reduced to between 10 nm and 30 nm using a planetary mill and finally a ball mill. Then, the smaller particles can provide the intimate mixture.

The purpose of washing of the oxidized mixture is to eliminate soluble metal salts. A drying step may be employed in order to eliminate larger part of water content. It was surprising to discover that the method including milling, washing, and drying yields greatly improved results as described below. The method does not require activation of the oxide mixture at high temperatures, such as 700° C. to 800° C. The method requires activation of the oxides by heating to temperatures of 100° C. to 160° C. to produce the metal oxides and eliminates activation at high temperatures. The product has a much greater catalytic activity than that obtained by the old process disclosed in U.S. Pat. No. 3,210,295, issued on Oct. 5, 1965.

An intimate mixture of 300 grams of tin oxide powder and 100 grams of antimony oxide powder, each having a particle size of less than 0.4 mm is oxidized in an enamelled apparatus at 80° C. by aqueous 50% nitric acid until nitrous vapors are no longer given off. An aqueous slurry of antimony oxides and tin oxides is obtained and decanted. The slurry of oxides is carefully washed and dried at 1000° C. for 10 hours. Flattened pellets of less than 4 mm and of the same height are made by pressing the mixture with a pressure of 0.5 metric ton/cm using a standard pelleting machine. The pellets are then calcined at 900° C. for 8 hours.

Pellets are used to enable the material to be milled to the correct nano particle size. The disclosed method for preparing co-doped metal oxides reduces the cost associated with equipment and material. For example, the use of the co-doped metal oxides prepared in accordance with the disclosure requires only one-fifth of the quantity of the co-doped metal oxide used by the conventional method. Also, the apparatus does not require a reaction at high temperature (e.g. 700° C. to 800° C.) as needed for the conventional method.

In some embodiments, the method for preparation of the co-doped metal oxides may include oxidizing a substance, for example, composed of intimately mixed gadolinium oxide, tin oxide and antimony oxide powder, having a particle size not over 0.5 mm with a ratio of gadolinium to antimony in the range of 0.3 to 10 and a ratio of tin to antimony in the range of 1 to 10, with nitric acid. The prepared nitrates form a clear suspension that can then be reduced to produce a composition of co-doped gadolinium tin oxide and antimony oxide, which can be washed and dried by heating the oxides only at a temperature of about 160° C. to produce the synthesized structure.

In some embodiments, the method for preparation of a co-doped metal oxide composition may include oxidizing a substance including intimately mixed cerium, tungsten, silver, with tin and antimony powders of a particle size of less than 0.4 mm and a ratio of metal oxides to tin in the range 1 to 10, with nitric acid to produce a synthesized structure or composition of co-doped metal oxides, which can be washed and dried by heating the oxides at a temperature of about 160° C. to produce the synthesized structure or composition. The composition may be subjected to a temperature of 900° C. for 10 hours, which produces rapid decomposition of the excess nitrous compounds and removes the excess nitrogen and produces a co-duped nano twin or tri metal compound, which is then milled for about a period of time, such as 35 minutes, in a bead mill to produce the nano particles. Finally these nano particles can be added to a suitable water bourn coating medium to achieve a light energy absorbing structure that is clear flexible and unique.

Figure 4:
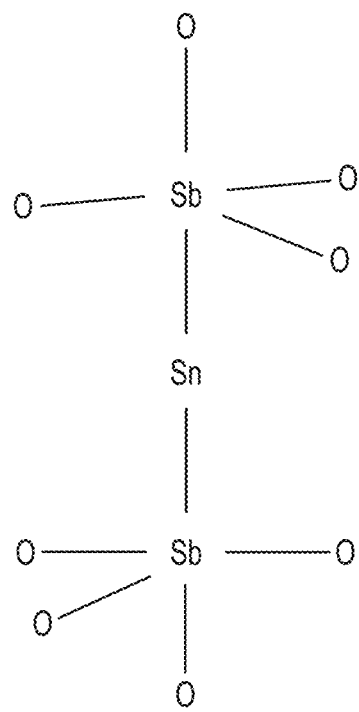
FIG. 4 shows a synthesized structure for co-doped antimony tin oxide in accordance with embodiments of the present disclosure.
Figure 5:
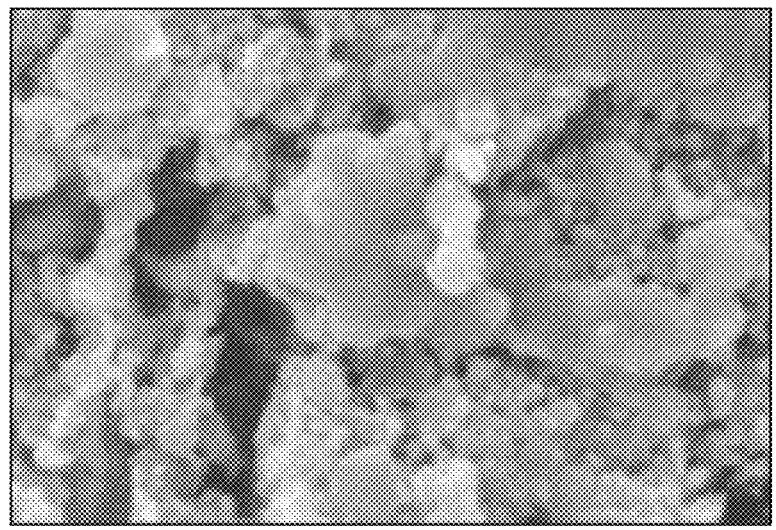
FIG. 5 shows a scanning electron microscopy (SEM) image of the co-doped antimony tin oxide in accordance with embodiment of the present disclosure.

FIG. 4 shows a synthesized structure for co-doped antimony tin oxide in accordance with embodiments of the present disclosure. As shown in FIG. 4, the co-doped antimony oxide includes antimony, tin, and oxygen atoms positioned in a synthesized structure. FIG. 5 shows a scanning electron microscopy (SEM) image of the co-doped antimony tin oxide in accordance with embodiment of the present disclosure.

Having described several embodiments, it will be recognized by those skilled in the art that various modifications, alternative constructions, and equivalents may be used without departing from the spirit of the disclosure. Additionally, a number of well-known processes and elements have not been described in order to avoid unnecessarily obscuring the disclosure. Accordingly, the above description should not be taken as limiting the scope of the disclosure.

Those skilled in the art will appreciate that the disclosed embodiments teach by way of example and not by limitation. Therefore, the matter contained in the above description or shown in the accompanying drawings should be interpreted as illustrative and not in a limiting sense. The following claims are intended to cover all generic and specific features described herein, as well as all statements of the scope of the method and system, which, as a matter of language, might be said to fall there between.

What is claimed is:

1. An aqueous composition comprising:
   a water-miscible polymer comprising polyurethane;
   a non-ionic surfactant comprising a polydimethylsiloxane-alcohol ethoxylate;
   a cationic polysiloxane;
   an IR absorber; and
   at least one water-soluble UV absorber.

2. The composition of claim 1, further comprising at least one pigment selected from chromium oxide, aluminum pigments, copper pigments, cobalt pigments, manganese pigments, cobalt pigments, iron pigments, cadmium pigments, chromium pigments, lead pigments, titanium pigments, tin pigments, green pigment, yellow pigment, orange pigments, red pigments, brown pigments, black pigments, and carbon pigments.

3. The composition of claim 2, wherein the pigment is shaped to be flattened disks and the pigment is in an amount of up to 5 percent by weight of the total composition.

4. The composition of claim 1, wherein the IR absorber is a co-doped metal oxide selected from gadolinium oxide, tin oxide, iron oxide, manganese oxide, copper oxide, cobalt oxide, nickel oxide, antimony trioxide ($Sb_2O_3$), tin oxide ($SnO_2$), silver ($Ag_4O_4$) and chromium oxide ($Cr_2O_3$).

5. The composition of claim 1, wherein the UV absorber is 0.2% to 5 w/w % 2-Hydroxy-2-methyl-phenyl-propane-1, alpha-[3-[3-(2H-Benzotriazol-2-yl)-5-(1,1-dimethylethyl)-4-hydroxyphenyl]-1-oxopropyl]- and including omega-hydroxypoly(oxo-1,2-ethanediyl) and omega-[3-[3-(2Hbenzotriazol-2-yl)-5-(1,1-dimethylethyl)-4-hydroxyphenyl]-1-oxopropoxy]poly(oxy-1,2-ethanediyl), and polyethylene glycol 300.

6. The composition of claim 1, further comprising a dispersant.

7. The composition of claim 1, further comprising mono propylene glycol.

8. The composition of claim 1, wherein the polymer is less than 36 w/w %.

9. A kit comprising:
   a first composition comprising the composition of claim 1; and
   a second composition comprising a crosslinker.

* * * * *